(12) United States Patent
Rice et al.

(10) Patent No.: US 10,009,732 B1
(45) Date of Patent: Jun. 26, 2018

(54) MOBILE MEDIA COMMUNICATIONS SYSTEM

(71) Applicant: Deep Rock Ventures, Inc., Thousand Oaks, CA (US)

(72) Inventors: Fredrick Rice, Thousand Oaks, CA (US); Gage Wyatt Siuniak, Thousand Oaks, CA (US); Joshua Noel Campbell, Thousand Oaks, CA (US); Christopher Richard Darby-Zoelle, Thousand Oaks, CA (US); Nicholas Raymond Riddle, Thousand Oaks, CA (US); Carmelo John Di Bella, Thousand Oaks, CA (US); Sandar Thomas Olds, Thousand Oaks, CA (US); Thomas Allen Stein, II, Thousand Oaks, CA (US)

(73) Assignee: Deep Rock Ventures, Inc., Thousand Oaks, CA (US)

(*) Notice: Subject to any disclaimer, the term of this patent is extended or adjusted under 35 U.S.C. 154(b) by 2 days.

(21) Appl. No.: 14/995,206

(22) Filed: Jan. 14, 2016

Related U.S. Application Data

(63) Continuation of application No. 14/527,777, filed on Oct. 30, 2014, now Pat. No. 9,288,617.

(51) Int. Cl.
*H04W 4/04* (2009.01)
*H04L 29/08* (2006.01)

(52) U.S. Cl.
CPC .............. *H04W 4/04* (2013.01); *H04L 67/10* (2013.01)

(58) Field of Classification Search
CPC ....... H04W 4/021; H04W 4/02; H04W 4/023; H04W 4/206; H04W 4/022; H04W 64/00;
(Continued)

(56) References Cited

U.S. PATENT DOCUMENTS 9,288,617 B1 3/2016 Rice et al.
9,420,422 B1 8/2016 Rice et al.
(Continued)

*Primary Examiner* — Kwasi Karikari
(74) *Attorney, Agent, or Firm* — Sean Casey

(57) ABSTRACT

A computer implemented method and system that enables mobile and desktop devices to automatically communicate with websites of brick and mortar businesses, which are relevant to a category of interest and proximate to their current or a prospective geographic location. The system and method further enables generation of well-formed websites, media, and multimedia, and to concurrently and automatically demographically and geographically distribute and push the websites and media to nearby and prospectively interested mobile and desktop devices with relevancy-amplified, geotargeted media and multimedia communications, which media are selected by real-time machine-learned, high-probability consumer interest weighting and relevancy functions that are continuously updated in response to monitored consumer actions. The system further enables geographically regional and inter-regional systems management of these geotargeting capabilities to enable automated, local to worldwide replication and prospective advance market regional and demographic testing of the geotargeted and relevant distributively pushed media communications.

35 Claims, 5 Drawing Sheets

(58) Field of Classification Search
CPC ... H04W 64/003; H04W 40/20; H04W 4/027; H04W 4/028; H04W 4/04; H04W 4/06; H04W 4/08; H04W 8/18; G06Q 30/0261
See application file for complete search history.

(56) References Cited

U.S. PATENT DOCUMENTS

| | | |
|---|---|---|
| 2008/0320543 A1* | 12/2008 | Wang .................. H04N 7/162 |
| | | 725/131 |
| 2012/0129543 A1 | 5/2012 | Patel et al. |
| 2013/0024901 A1 | 1/2013 | Sharif-Ahmadi et al. |
| 2015/0081851 A1 | 3/2015 | Oyman et al. |

\* cited by examiner

MOBILE MEDIA COMMUNICATIONS SYSTEM

CROSS-REFERENCE TO RELATED PATENT APPLICATION

This application is a continuation of co-owned prior filed application Ser. No. 14/527,777, filed Oct. 30, 2014, now U.S. Pat. No. 9,288,617, issued Mar. 15, 2016, which is incorporated by reference herein in its entirety.

TECHNOLOGICAL FIELD

The present disclosure relates generally to systems and methods for automated relevancy-weighted, pushed media and multimedia distribution and communications for mobile and static electronic communications devices such as mobile phones, tablets, laptops, portable electronic devices, automotive communications devices, aircraft on-board entertainment systems, billboard and marquee systems, desktop computers, and related devices, systems, and electronics.

BACKGROUND

Despite much progress in recent decades, problems persist in the mobile device field of technology with respect to enabling efficient, predictable, and responsive communications of various types of media to unmoving or static and moving and dynamic mobile devices. Challenges presently exist with current systems and methods available for managing large mobile device communications networks, for enabling updated media to be created and disseminated, for preventing dissemination of undesired media communications, and for enabling more predictable and desirable communication of preferred media communications.

Such preferred media communications have long been sought by both those creating new and interesting media, and by those seeking notification of the availability of such new media. However, present day systems and methods fall short in enabling these capabilities, and instead often rely upon seemingly and apparently random dissemination of ineffective, unwanted, and irrelevant media communications. In fact, most mobile and static devices are often crammed and inundated with media communications that are not relevant to any particular geographic area or region. Further, such unwanted media communications are often sourced from suspicious and shadowy online predators who are seeking only to surreptitiously capture personal information from unprotected mobile or static devices.

Many existing mobile device communication methods and systems purport to enable sophisticated and targeted media communications to specifically identified demographic and geographic mobile and static devices. However, most such systems and methods fail to achieve their advertised capabilities, and are instead limited to generating revenue streams as a function of mass cramming of untargeted, repetitive media communications to unsuspecting mobile and static devices. Whether such mass cramming is sourced from putatively reputable entities, or less savory purveyors, recipient mobile and static devices rarely benefit.

Despite decades of progress in the mobile communications management field, vast numbers of legitimate businesses remain often unwilling to try and are therefore unable to communicate with mobile and static devices in any effective way. This is primarily because so many have found the existing systems to be entirely ineffective, extraordinarily expensive, and far too time consuming to employ. Moreover, anecdotal experiences demonstrate that past attempts have been eclipsed by large, online entities that consume nearly all available bandwidth for such media communications.

Other technical problems that persist in the management of mobile communications systems have arisen from the need for mobile devices to use new tools to block unwanted, unpredictable, and sometimes malicious media content from being communicated to mobile devices from otherwise legitimate sources. As an example, many mobile devices have been inundated with seemingly random media content when such devices are being used to communicate with other devices and resources across the internet and World Wide Web.

As a result of the deluge of such undesirable media, mobile devices as well as static devices have adopted new technology that prevents such undesirable media from being communicated to the mobile devices. Unfortunately, however, this new blocking technology cannot distinguish important or otherwise desirable media from the unwanted or malicious media. In turn, the mobile devices are then impaired in that they cannot receive possibly needed media and programming code bundled with that media in bundled data or data streams, and thus the mobile or static devices lose or suffer from degradation of needed functionality.

What continues to be needed but otherwise unavailable is a system that enables more precise media communications with mobile and static communications devices and electronics. The mobile, internet, and world wide web communications industry would be favorably disrupted and benefit tremendously from new systems and methods that enable mobile system communications with targeted media that can be directed as a function of geographic location as well as a measure of media relevancy to the targeted mobile devices.

The field of mobile communications would very likely be receptive to new capabilities that enable mobile communication of media having amplified relevancy measures that take advantage of predetermined preferences, which might ideally include categories of interest, and even favorite items of interest to individually configured mobile devices and electronics. Such technical improvements would enable mobile, static, and other electronic devices to avoid impaired or degraded operational capabilities.

Enabling unimpaired and optimized media communications to such devices would also ensure that needed programming code and related information could reach these devices in an efficient and timely way because the mobile devices could avoid having to use the media blocking technologies. More preferably, even if such blocking technologies remain, the long sought improvements should create new capabilities and technologies that enable important, targeted, and more precise media communications and code and related information bundled into the media communication data streams, to bypass or avoid the blocking technologies and reach the mobile and other electronic devices.

BRIEF SUMMARY

An improved system and method for mobile communications management includes a directory search monitor that is configured to receive one or more of a static entity request, which contains at least a static location, and a dynamic entity request having at least a dynamic location. A mobile entity monitor is also included and coupled to and communicates with the directory search monitor, and other system components. The mobile entity monitor is configured to receive a mobile entity request that has at least a temporal mobile location, which includes at least time and location data. The static, dynamic, and temporal mobile locations each also may include with the location data, embedded geographic location coordinates or other geographic location data. The mobile entity monitor may also be configured to receive predetermined categories of interest and one or more favorite categories or websites, in connection with, as part of, and or independently from receiving the temporal mobile location and related time and location data.

The system and method also includes a media server that communicates with the directory search and mobile entity monitors, and the other components and elements of the methods and system. The media server is configured to receive at least one of the dynamic, static, and mobile entity requests and to communicate these static, dynamic, and mobile request with location data to other components of the system and method.

Among other capabilities, the media server receives, stores, and retrieves a large variety of continuously updated, geotargeted media to establish a plurality of different geotargeted media. Such geotargeted media can include images, graphics, text, location, and or region targeting information, multimedia information such as video and audio, among other types of data. The media server retrieves and communicates such media from the plurality and composites and or precisely positions and arranges one or more of the plurality of media into combination data streams or data bundles.

The media is also configured to receive geotargeted media having a media push tag that can be included in metadata with the geotargeted media, or which can be encoded or otherwise embedded as part of the geotargeted media data and information. The push tag preferably includes a dated time limit and a discrete impression count. The dated time limit can be used by the media server to specify a time period during which the geotargeted media can be communicated, and where at times outside the time period, the geotargeted media can be deemed expired. The impression count can be used by the media server to only communicate the geotargeted media a certain number of times, where after it is deemed exhausted.

The data bundles communicated by the media server embed, among other information, the plurality of different geotargeted media into the data stream or data bundles so that the media includes among other data, attributes of style, format, position, encoding, and similar types of information, in a pre-rendered format or arrangement before communicating the data bundle as a response. In other aspects of this capability, the media server, when creating the data streams and data bundles, separately positions each media item into pre-defined positional zones about a canvas in predetermined arrangements with the at least one network site. The canvas establishes a work space wherein different formats and types of information can be placed, positioned, overlaid, and dynamically movable with respect to the canvas arrangement and configuration and other data incorporated into the data bundles and streams.

The media server is also configured to receive and or retrieve at least one network site from the host network server, to generate the one or more of the composited data bundles that embed the geotargeted media along with the at least one network site. Once embedded or packaged into the data bundles in a pre-rendered web page or similar format, the media server is adapted to communicate the one or more composited data bundles as responses to the requests. The media server is also preferably configured to optionally communicate the composited data bundles directly to at least one of the directory search and mobile entity monitors, and or other elements and components of the system and method.

A geocoder is also included in the method and system, and may be coupled to, a part of, and or in communication with the media server, or other system components. Preferably, among other capabilities, the geocoder is configured to receive a geographic location, grid identifier, coordinates, or other type of geographic location information in any of many possible forms, which can also include street addresses, zip codes, and place names such as cities, towns, neighborhoods, boroughs, counties that can be converted to a geographic location and approximate coordinate. In complementary aspects, the geocoder is also customized to convert any received locations, for example, the static, dynamic, and temporal mobile locations from one type or format of geographic location data or coordinates to another.

The geocoder is further configured to upon receipt, generate for each dynamic, static, and temporal mobile location, a geozone designator, which may more preferably be at least one of respective static, dynamic, mobile, and temporal mobile geozone designators. The geocoder incorporates the capability to use the received locations and the respectively generated geozone designator, to generate a grid of geozones of nearby geographic locations. More specifically, the geocoder uses the received locations and generated designators, to generate a grid of equal area isometric and adjacently arranged and positioned geozones each having respectively assigned geozone designators.

The geocoder-generated grid is arranged to include a centrally positioned geozone that includes the received location, which has the generated geozone designator. In other words, each geozone of the generated grid is assigned a calculated, respective unique geozone designator, which for the received location(s), is the grid-central or centrally positioned, geozone of the received location, with its corresponding geozone designator.

It is also preferred that the geocoder generate the equal area geozone grids to have isometric, predetermined polygonal and or rectilinear dimensions that circumscribe and define the area of each resulting polygon or geozone. The media server is also configured to receive, retrieve, and communicate the geotargeted media and network site keys that are proximate or nearby some predetermined distance to the received locations.

Both the geotargeted media and the network site keys are selected and retrieved if they have location data that establishes proximity within a preferred, established, or predetermined proximity range to the received static, dynamic, and temporal mobile locations. Such proximity or geographic relevance is established if the location data of the network site keys and or the geotargeted media have a geozone or geographic identifier that equals the geozone or geographic designator (of the static, dynamic, and temporal mobile locations) of any of the geozones of the generated grid, which includes the received location(s).

Preferably, the location data of the network site keys and or the geotargeted media is communicated to the geocoder, which generates the geographic or geozone identifier, and then rapidly compares it with geographic or geozone designators (of the static, dynamic, and temporal mobile locations) of the generated geozones of the grid. Once such geotargeted media and network site keys are retrieved after and responsive to the rapid comparison, those media and keys having the established, preferred, or predetermined proximity or proximity range are communicated by the media server in a response to the requests. In a summarized example, the received static, dynamic, and or temporal mobile locations are communicated to the geocoder, which respectively computes or generates the grid of geozones each having geozone or geographic designators. The locations for the geotargeted media and network sites keys are also communicated to the geocoder, which generates the media/site key geozone identifiers. The geocoder then compares the identifiers (media and network sites) to the designators (static, dynamic, temporal mobile locations), and ascertains proximity, distance, range, or range of proximities between the identifiers and designators.

The media server also contemplates configurations that generate, store, retrieve, communicate, and calculate a weighting for the geotargeted media and the network site keys and related information, which enables various media and retrieved network sites to be compared to others for purposes of establishing relevancy of the media. The relevancy determination is made by comparing aspects of the media and network sites to the received locations, categories, and other information received by the media server.

In contrast and in other exemplary configurations, the weighting calculation may also be configured to prevent communication of unwanted or otherwise prohibited geotargeted media. For example, it may be desired that geotargeted media of certain types, categories, and having certain locations should not be communicated in response to certain requests. For a specifically requested network site, the media server may be configured whereby geotargeted media is selected from a group of geotargeted media such that each media item has a media category identifier that is not equal to the category identifier of the network site.

The systems and methods also contemplate similar capabilities wherein categories that are defined to be relevant to one another can be identified by the media server as the weighting is calculated. The media server enables these aspects by incorporating a relevancy cross-table that maps each individual category in a discrete array to all other categories, using a category relevancy parameter. The category relevancy parameter can be "zero" when two individual categories are deemed to irrelevant to one another, and can be higher than zero depending upon the predetermined degree of relevance there between.

Where the mapping or scan results in no matches or similarities, the calculated weighting is lower. Where the scan or mapping finds matches or similarities, the calculated weighting is higher. When the calculated weighting is higher than or exceeds a weighting threshold, the geotargeted media and or network site key is communicated by the media server.

The system and method also further incorporates a host network server that is coupled to and in communication with the media server, the directory search and mobile entity monitors, and other elements of the system and methods. The host network server receives, normalizes, parses, stores, retrieves, and communicates network site information, and is configured, among many various capabilities, to generate unique network site keys, and to also communicate to and receive from the media server the geotargeted media and the network site keys.

The host network server is further configured to retrieve the network site data to combine with the media push tags received from the media server as is described elsewhere herein, which have the noted time limit and impression count. The media server is configured to communicate the media push tags directly to the host network server, or any of the other components of the system and method.

In this exemplary arrangement, the media server is also adapted to retrieve and to generate the above-described weighting for the geotargeted media, by also calculating the relevancy parameter using an elapsed time within the time limit and expended impression count from the impression count. In this way, the media server can retrieve and communicate geotargeted media in response to requests, more often when there are unexhausted impression counts and a limited and unexpired amount of time left in the time limit to expend those impression counts.

The host-network-server-received network site information also may include location data and coordinates, category data and identifiers, and other types of identifiers and information related to the network site information. The network site keys are initially generated by the host network server and or its components and subsystems, and the keys are used to rapidly look-up network site information from a network site repository.

The host network server uses the keys to rapidly retrieve from the network site repository, at least one network site that matches at least one of the network keys. With the retrieved at least one network site, the host network server, like the media server, can generate one or more composited data bundles or data streams embedding the geotargeted media with the at least one network site, into a pre-rendered webpage or similar format or arrangement or configuration. Once the host network server combines or composites the disparate data into one or more data bundles, the host network server is also configured to communicate the one or more composited data bundles as direct responses to the requests. The host network server is further adapted to communicate the composited data bundles directly to at least one of the media server, directory search, mobile entity monitors, and other components of the system and method.

To enable further aspects of the systems and methods, the host network server enables communication of the network site keys to the media server with the location data. The media server is also adapted to receive the keys and location data, and to enable or communicate with the geocoder to convert the respective locations into geozone identifiers. The media server is also capable of using the geozone identifiers in searches and comparisons, and can store for later retrieval or communication the network site keys with the location data.

The method and system also includes the host network server further including a network site key and value storage system that establishes unique network site keys mapped to each of a plurality of hosted network sites. The host network server key-and-value-storage-system is adapted so that the values may contain a plurality of data types, and so that the stored key and values data may be stored in various efficient ways that ensure optimized response speed, data retention durability and replication and backup, and efficiently optimized storage and longer term data replication.

More preferably, the host network server key and value storage system is configured to avoid the impediments of legacy database and indexing systems. Preferably, the host network server is configured to be optimized for fast response times, while maintaining data durability using snap-shotting or semi-persistent storage techniques, which can employ data sharding and other optimization techniques if desired for the various possible storage and retrieval configurations.

In other optionally preferred configurations, the key-value storage system can be adapted wherein the host network server is configured to generate unique network site data keys uniquely using various methods to avoid generated key collisions, including hashing, which are often also referred to as hash functions, codes, and sums. In certain alternative or preferred arrangements, it may be more appropriate to enable the quick key lookup capabilities by generating unique keys using perfect hash functions.

In some aspects, the systems and methods contemplate generating the keys for the key-value pairs using network site information addresses, such as internet and web style uniform resource locaters (URLs) or client-side URLs (cURLs), which may contain the information needed to uniquely, rapidly, and easily identify a network site and detailed or specific elements thereof during configuration, operation, and use of the system and methods.

In still other respects, the host network server is configured to receive or retrieve the network site data with a category data identifier, and to receive with the static, dynamic, and temporal mobile requests, respective static, dynamic, and mobile predetermined category and favorite preferences. These predetermined category and favorite preferences may be communicated to the media server, for use in calculating the weightings and relevancy parameters.

In these additionally aspects of the host network server configurations, the media server is further configured to retrieve and generate or calculate the weighting for the geotargeted media using this additional information. More specifically, the media server calculates the weighting with a geotargeting parameter generated from the static, dynamic, and temporal mobile locations. The media server also calculates the weighting with a relevancy parameter generated from the predetermined category and favorite preferences, and a predetermined array of categories which maps or scans the relevancy parameter to a plurality of category data identifiers. Those geotargeted media items that have calculated weightings exceeding the weighting threshold are then identified to be queued for communication in response to the requests.

Additional configurations of the mobile media communication system and methods also may include a management server that is configured to manage resources across the system and during operation of the methods. The management server is further adapted to enable data acquisition including network site data and information. The management server may also be configured with the capability to normalize and store the acquired data, and to enable communication of the network site data and related information to and from the various system components and in the methods of operation.

The management server may be preferably configured to manage a specific and predetermined, limited geographic region for the mobile media management system and methods, and may be replicated for use in adjacent and remotely located geographic regions. The management server is coupled to and configured to communicate with the media server, the host network server, and the directory search and mobile entity monitors, among other components and elements of the systems and method. It is also configured to receive media having geotargeting locations, category data, and related information, and to communicate such to and from the other system components.

The management server may also be configured with, include, and or be coupled to a data analytics and informatics capability or engine, which can be adapted for communication with the other system components to enable information collection and analysis. The system and method also contemplates one or more system components to be coupled with, in communication with, and or incorporating one or more external and internal and or intra-network domain controllers or internet name servers, which are configured to map, store, lookup, retrieve, and communicate local and remote names and addresses, and internet routing for network sites of the system and methods of the mobile communications management systems, and related systems.

The mobile media communication system and methods is also configured in certain aspects to operate with, include, and enable a mobile application, which is configured to periodically communicate with the host network, directory search, management, and media servers, and the mobile entity monitor, and the other components of the system and methods. The mobile application is also configured, among other capabilities, to periodically and on demand to retrieve a temporal location with geographic coordinates and or related data, to store predetermined category and favorite preferences, and to periodically communicate the temporal location as a temporal mobile location, and the predetermined preferences.

Among other configurations and arrangements, the predetermined preferences can be preset in the mobile application and can be communicated to the mobile from any of the other components of the system and method, including preferably the mobile application monitor. In any of the configurations and arrangements of the mobile application, it is configured to be downloaded to and to operate on any of a number of ubiquitous static, portable, mobile, and hand-held electronic devices, and to be compatible for use with a variety of electronic device hardware and software, and operating systems and environments.

In other aspects of example implementations of the mobile communications management system and methods, the system includes a plurality of computer processors, transient memories and non-transient computer-readable storage media, network subsystems and interfaces, user interfaces and displays, and communications capabilities. These components and subsystems are in part collocated, and are also configured in well-known geographically disparate, cloud-based arrangements that enable optimized and on-demand resource allocation, reliability, resilience, and system-wide durability, using a variety of wide-available information technology architectures and implementations.

This summary of the implementations and configurations of the mobile media communications system is intended to introduce a selection of concepts in a simplified and less technically detailed arrangement, which concepts are further described in more detail below in the detailed description. This summary is not intended to identify key features or essential features of the claimed subject matter, nor is it intended to be used as an aid in determining the scope of the claimed subject matter. The features, functions, capabilities, and advantages discussed here may be achieved independently in various example implementations or may be combined in yet other example implementations, as further described in part elsewhere herein, and which may also be better understood by those skilled and knowledgeable in the relevant fields of technology, with reference to the following description and drawings.

BRIEF DESCRIPTION OF THE DRAWING(S)

A more complete understanding of example configurations, adaptations, arrangements, and implementations of the present disclosure may be derived by referring to the detailed description and claims when considered with the following figures. In these figures, identical and like reference numbers refer to similar elements throughout the figures. The figures are provided to facilitate understanding of the disclosure without limiting the breadth, scope, scale, or applicability of the disclosure. The drawings are not necessarily made to scale, and are made to further inform those skilled in the field in the context of the written description and claims.

FIG. 1 is an illustration of a mobile communications management system and method in accordance with exemplary configurations and implementations;

Figure 1:
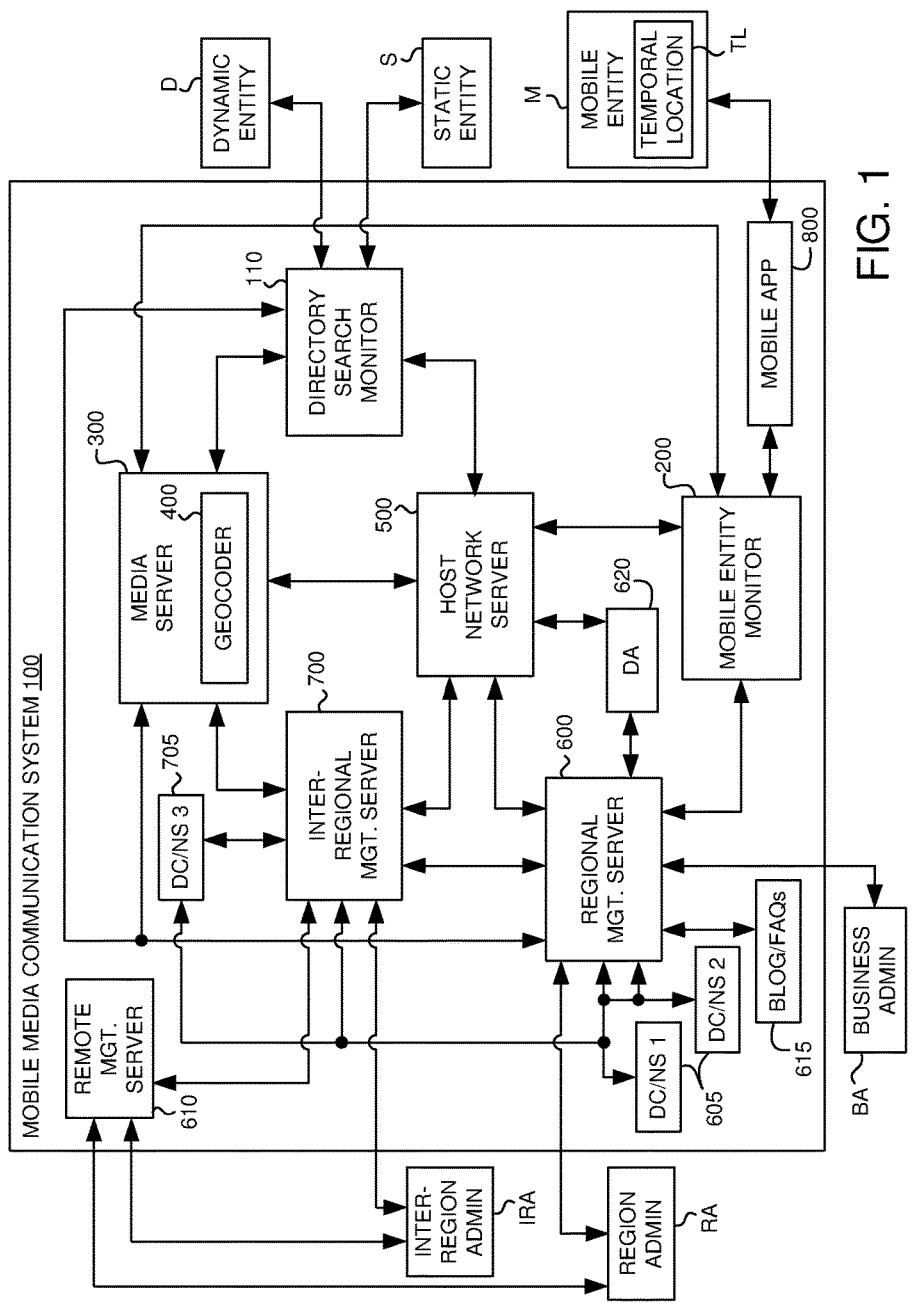
Figure 2:
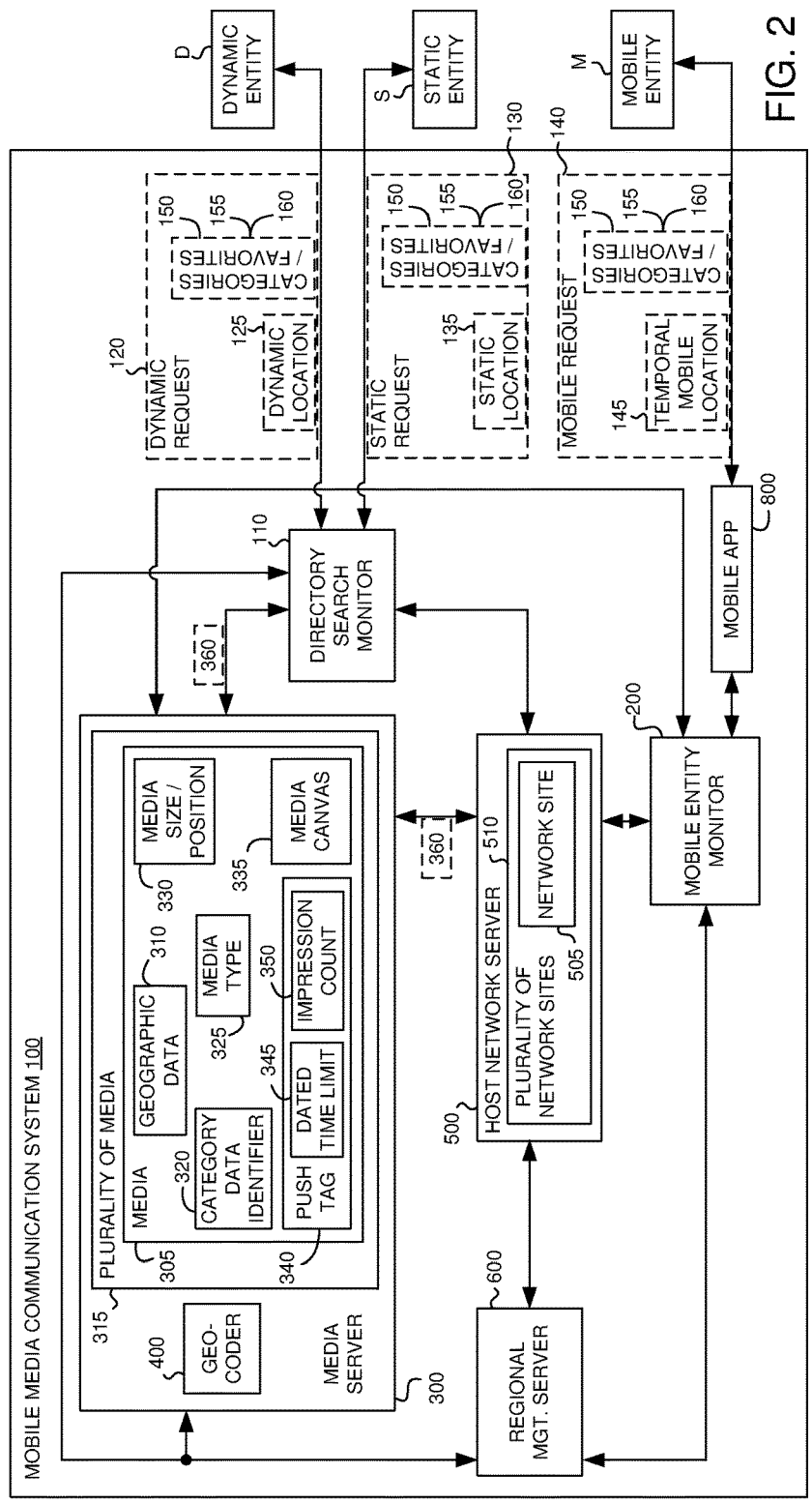
FIG. 2 is an illustration of components of the system and method of FIG. 1, and in accordance with further exemplary implementations and arrangements of the system.
Figure 3:
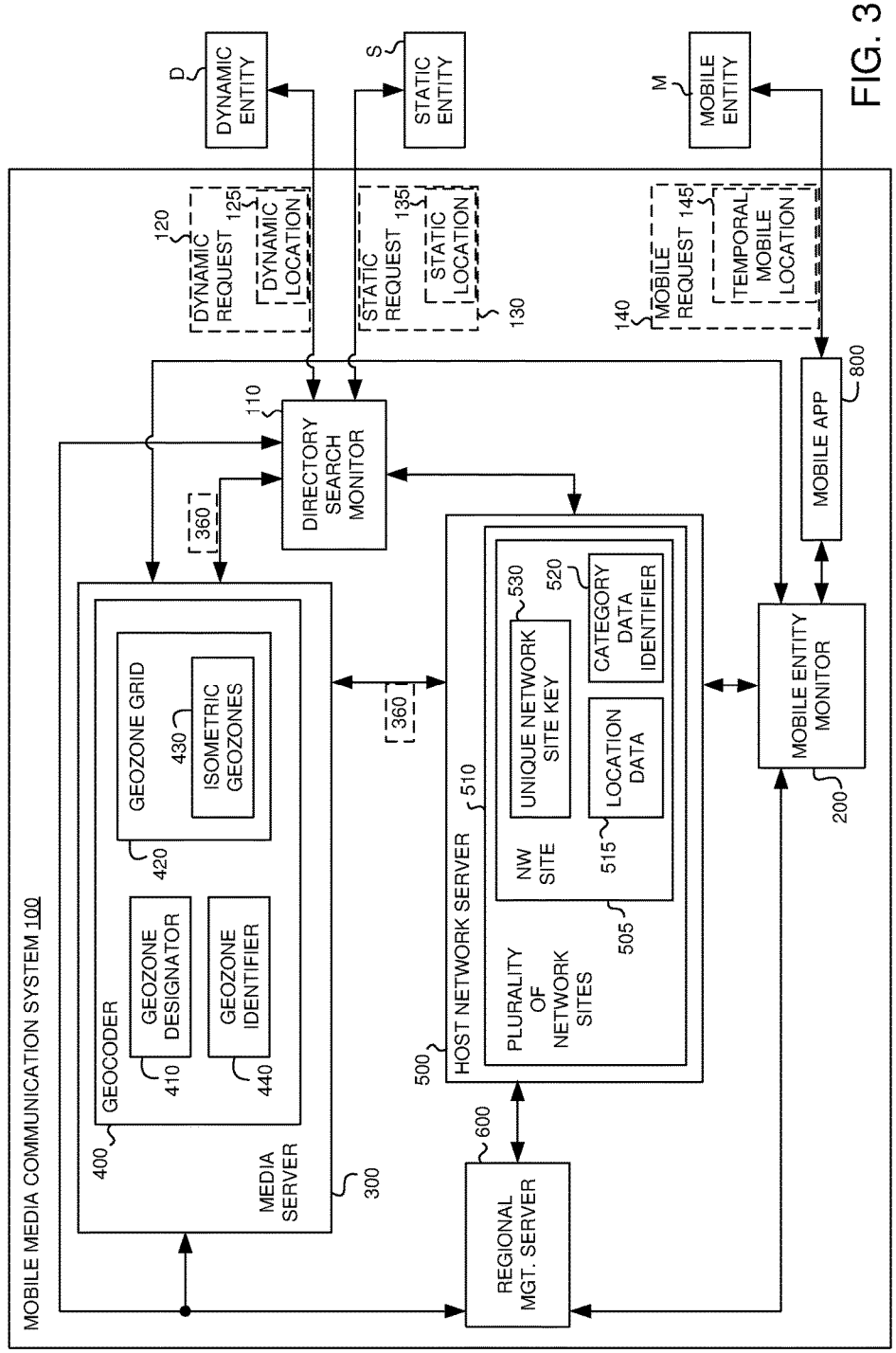
FIG. 3 is an illustration of the example implementations of FIGS. 1 and 2 and including various additional technical details illustrating further capabilities of the system.
Figure 4:
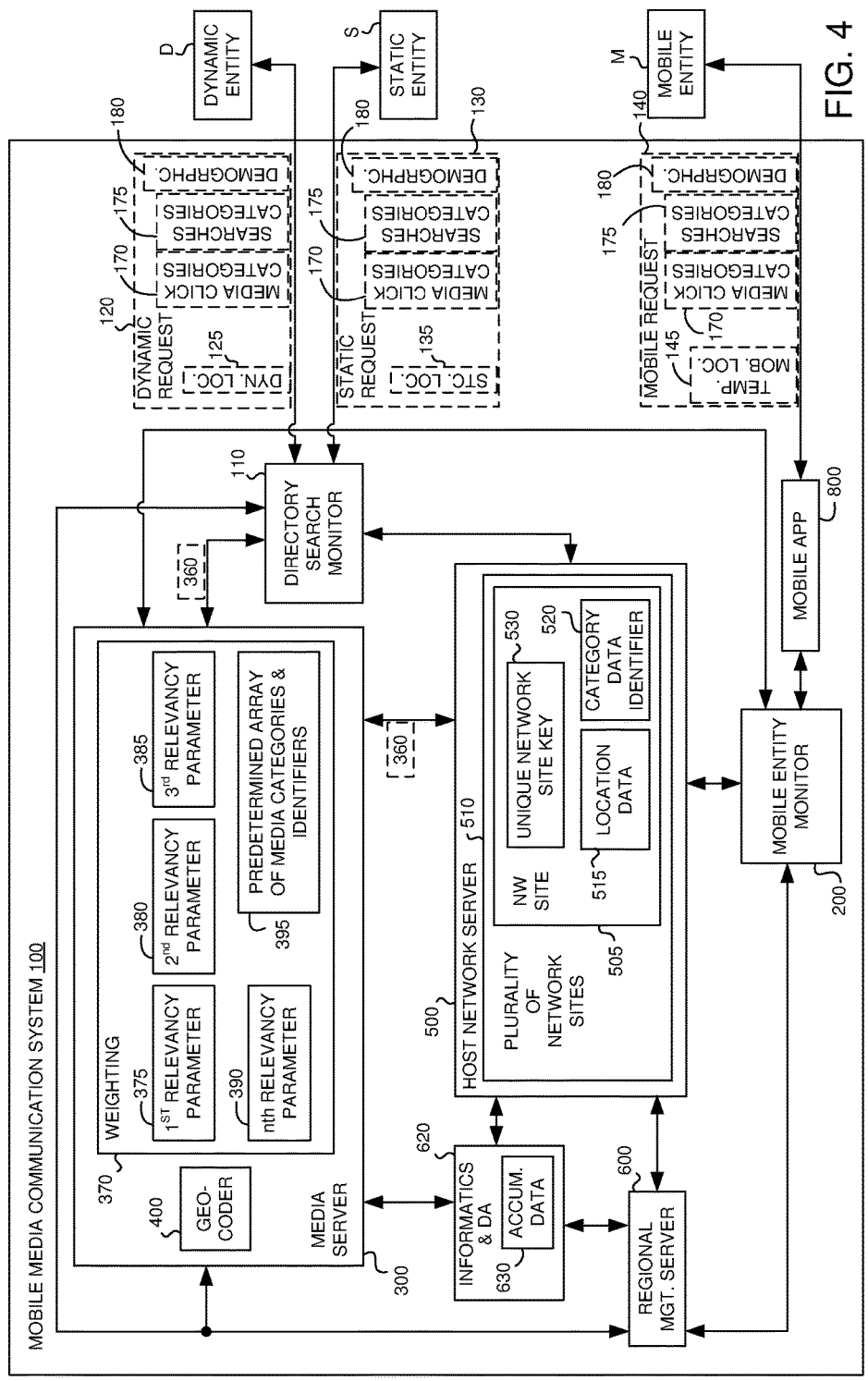
Figure 5:
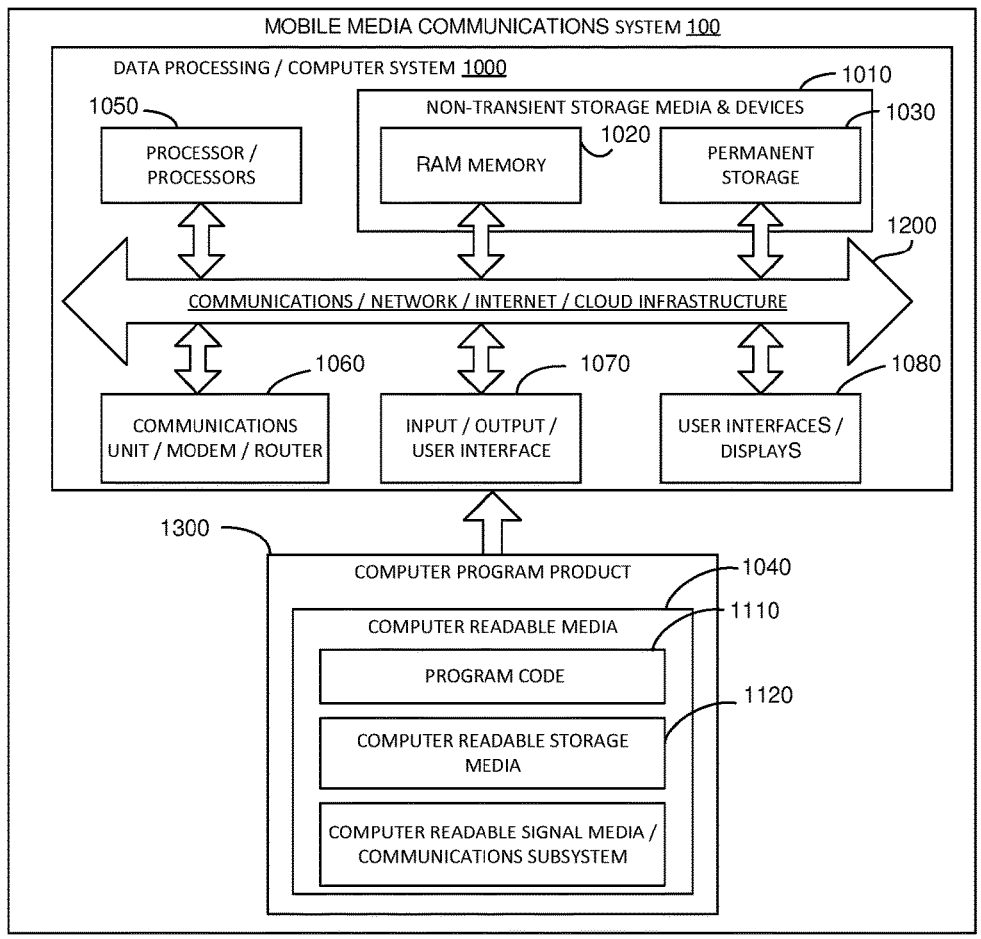

FIG. 4 is an illustration of the configurations of FIGS. 1, 2, and 3 and including further detailed examples and alternative arrangements of the system; and FIG. 5 is an illustration of the example implementations of certain aspects the preceding figures, and also illustrates details of other capabilities and methods of the system as well as examples of hardware and software configurations that enable various other aspects the systems and methods.

DETAILED DESCRIPTION

The following detailed description is exemplary and is not intended to limit the disclosure, the claims, or the demonstrative implementations and uses of the present disclosure. Descriptions of specific devices, techniques, and applications for use and operation are provided only as examples. Modifications to the examples described herein should be readily apparent to those of ordinary skill in the art, and the general principles defined herein may be applied to other configurations and arrangements without departing from the spirit and scope of the disclosure. Furthermore, there is no intention to be bound by any expressed or implied theory presented in the preceding descriptions of the field of technology, background, summary, or the following detailed description. The present disclosure should be accorded scope consistent with the claims, and not limited to the examples described and shown herein.

Example and representative configurations, adaptations, and implementations of the present disclosure may be described herein in terms of specific hardware and software, architectures, and by way of physical, functional, and or logical systems, subsystems, components, and various processing steps and methods of operation. It should be appreciated that such representative and schematic figures and diagrams may be realized by any number of hardware, software, and or firmware components configured to enable, implement, and perform the specified capabilities and functions.

For the sake of brevity, conventional techniques and components related to use during operations, and other functional aspects of the systems (and the individual operating components of the systems), may be described here only with enough technical detail so as to enable those with ordinary knowledge, skill, and ability in the technical field to practice the implementations. In addition, those skilled in the art will appreciate that example implementations of the present disclosure may be practiced in conjunction with a variety of hardware, software, networked, world-wide-web-based, internet-based, and cloud-based configurations of the mobile media communication system, which may further incorporate various combinations of such implementations.

As should be understandable to those with ordinary skill in the art, after reading this description, the following are examples and example implementations of the present disclosure, and are not limited to operating only in accordance with these examples. Other implementations may be realized and utilized, and changes may be made without departing from the scope of the example implementations presented herein.

With reference now to the various figures and illustrations and specifically to FIG. 1, a system and method for mobile media communication 100 is described, which is implemented on at least one computer system having one or more processors coupled to and in communication with networks and user interfaces, and transient memories, and non-transient storage mediums, and other components of the system. This arrangement of the system for mobile media communication 100 includes, among other components and systems, a directory search monitor 110 coupled to and in communication with a mobile entity monitor 200, a media server 300, a geocoder 400, a host network server 500, a management server 600, a remote management server 610, an inter-regional server 700, and a mobile application 800.

Each of these cooperatively interconnected components incorporates various additional components and subsystems that enable the capabilities and innovations of the system 100. Further, the exemplary system 100 in this representative arrangement is further thereby enabled to interact with various external systems, components, and entities that may include information technologists such as systems operators and administrators, system users and customers such as customer support personnel, business owners.

The system 100 is further configured to enable use by and communication with and between such customers and business owners directly with targeted consumers using any electronic devices. Such consumers are able to interact directly with the business owners across various mobile media communications systems that are compatible for use with their respective electronic devices, whether such are desktop computers, laptops, hand-held devices, tablets, or mobile phones.

The system 100 is optimized to enable the consumers to rapidly receive geotargeted media that they may self-identify as being of interest or a favorite, as well as relevancy-amplified geotargeted media that is automatically selected and communicated as a function of such self-identification. Further, the system 100 is implemented to enable business owners to rapidly create dedicated network sites that communicate essential business information, and to directly and quickly communicate new media and information pushed to these consumers in a controlled, geotargeted way that has never before been available. Additionally, as is described in more technical detail below, the system 100 further enables both the business owners and interested consumers to avoid the many pitfalls presently encountered by preventing unwanted, irrelevant, and potentially conflicting or even possibly harmful media from being communicated between the business-owner system-customers and the interested consumers.

The mobile media communication system 100 is implemented to configure the management server 600 to be designated as a regional management server 600 that is located within or configured to communicate optimally within a specifically defined geographic region. In this way, the system 100 may be replicated to operate in service of various geographic regions, which further enables balancing of resource and operational loads. The regionally configured system 100 is adapted to be operationally managed by the management server 600, and to communicate with similarly configured, geographically remote regional servers 610, to ensure the system 100 performs optic optimally within each designated geographic region.

To further optimize regional and inter-regional use, operation, and management of the internal and inter-regional infrastructure that support system 100, the inter-regional management server 700 is preferably configured to primarily manage the operational use and resource loads of the regionally adapted management servers 600, 610. This configuration also enables business owners with greater geographic reach to replicate media communications with consumers across different geographic regions with greater ease, and enables the complementary aspect wherein the remote consumers are more easily able to communicate with business owners across the regions. This further enables such consumers to communicate with business owners located in areas where the consumers may intend to prospectively travel.

In each of these contemplated arrangements, the system 100 is adapted wherein the regional management servers 600, 610 and the inter-regional management server or servers 700 may be operated and maintained by respective regional technical support engineers and administrators RA and their inter-regional counterparts IRA. The business owners and their support engineering, service, and marketing personnel and administrators BA are able to employ system 100 though one or more system capabilities available through their desktop, laptop, mobile, and many other electronic devices through any of the regionally-centric management servers 600.

To optimize the capability for the system 100 to manage millions of business owner network sites for communication to millions of consumers, the regional and inter-regional management servers 600, 610, 700, enable, incorporate, manage, and or control one or more external and internal and or intra-network domain controllers or internet name servers (DC/NS) 605, 705. Theses DCs and NSs 605,705, are adapted to map, store, lookup, retrieve, and communicate local and remote names and addresses, and internet routing for network sites of the system 100, and related systems. Moreover, these name servers/domain controllers can also be configured to communicate with other externals systems such as top-level name servers, which can further improve network site and media communication response times.

The system 100 may be further modified to include or communicate with one or more network, internet, web log (blog), and or discussion or informational, frequently asked question (FAQ) systems. These can also be managed by and or coupled with the system 100 through the management servers 600, 610, 700.

It is often desirable to acquire and analyze system performance and to ascertain patterns of use, and statistics and demographics of users. The system 100 can implement and or communicate and utilize any number of informatics and data analytics (DA) tools and systems 620. Some useful and well-known systems include the proprietary Google Analytics, KISSmetrics, Clicky, Moz, and the free open source tools PIWIK, StatCounter, and OWA—Open Web Analytics. The media server 300 is alternatively configurable to communicate through the management servers 600, 610, 700, and or directly with the DA informatics engine 620 to accumulate data and statistics 630 and data on responses of entities D, S, M to communicated media 305, network sites 505, and search requests included in the received requests 120, 130, 140. The media server 300 analyzes the accumulated data and statistics to adjust the weightings 370 of communicated media 305 and network sites 505, as described elsewhere herein.

The system 100 also enables exemplary implementations of the directory search monitor 110 that interface externally to communicate with dynamic entities D and static entities S, which can be remote, external systems including desktop computers, laptops, tablets, hand-held devices, mobile phones, and the many other portable electronic devices. Preferably, the directory search monitor 110 hosts an externally-facing website or internet or application as a service (IaaS, AaaS) capability that monitors for requests from internet web browser systems requesting network sites from the system 100.

Additionally, the system 100 further enables configurations of the mobile entity monitor 200 with an interface to the mobile application 800, wherein the mobile entity monitor 200 can be hosted and operational on a centrally hosted system as part of the other internal components of system 100. The mobile application 800 is preferably hosted on a mobile entity M, which among other possible devices, can be a mobile or portable electronic device. As can be understood by those knowledgeable in this technology area, the mobile application 800 is contemplated here in the singular for purposes of example and detailed technical illustration, but in operation is enabled as a plurality of thousands and even millions of such applications 800 hosted on various electronic devices.

In any of the various implementations of the mobile media communication system 100, it is desirable to employ an optimized infrastructure and system architecture that enables consistent, persistent, on-demand performance, and information durability. More specifically, the preferred architecture for system 100 incorporates a hybridized cloud-based infrastructure, wherein the various components and subsystems of the mobile media communication system 100 may be individually configured to self-optimize as demand for processing power, storage, retrieval, data replication, communications, and backup increase and decrease within the geographic region served by each regionally designated systems 100.

The contemplated hybridized cloud-based infrastructure and architecture of the mobile media communication system 100 can be achieved in part using any of a number of commercially available cloud service providers (CSPs). Such CSPs enable various types of cloud-based infrastructures that range from individualized servers and virtual machines, to scalable enterprise storage and network communication systems. Each such arrangement can be configured with dedicated, on-demand, and combination configurations of processors, storage, communications bandwidth, and related systems, having guaranteed minimum response times, and data durability and persistence.

Many such capabilities are often configured in several aspects as service oriented architectures (SoAs) with infrastructure as a service (IaaS networks, communications, storage), platforms as a service (PaaS processors and virtual machines running preselected operating systems as preconfigured platforms), integration PaaS (platforms custom integrated with various IaaS, SaaS subsystems), and sometimes having on-demand software (SW) as a service (SaaS) licensing options. The most well-known CSPs and products include Microsoft's Azure, Amazon's Web Service (AWS), Google Cloud, Rackspace Cloud, and Hewlett-Packard (HP) Helion (formerly Cloud Compute and Public Cloud).

For purposes of the mobile media communication system 100, the preferred hybrid cloud system includes the system 100 established as customized, dedicated SoA components implemented on virtual machines and coupled by dedicated communications links in a secure, virtual private network (VPN) IaaS environment managed by the inter-regional and regional management servers 600, 610, 700, using the domain controllers/name servers 605, 705 to map the VPN intra-network private domain space between the management servers 600, 610, 700 and the directory search monitor 110, the mobile entity monitor 200, the media server 300, the geocoder 400, and the host network server 500. Preferably, the mobile applications 800 communicate with the system 100 and establish secure VPN and or SSL and non-secure open connections, as appropriate for various modes of operation, with the mobile entity monitor 200 and other system 100 components.

In addition to this hybrid cloud network communications infra-structure, the system 100 is also preferably configured with the SoA server components having well-formed MVC or model, view, control underlying architectures that employ robust server-side PHP: hypertext frameworks. More specifically, the SoA aspect of the architecture ensures that the components of system 100 are a collection of services communicating with one another to enable rapid load balancing wherein high demand for services can be met essentially within an instant, with duplicate service images being spawned across the iPaaS SoA system 100.

In contrast, as demand wanes, unneeded duplicate services can be quickly terminated and the resources abandoned so as to minimize costs. Here, the system 100 uses the classical definitions of SoA services wherein each service, whether it be an operating server or monitor, or a constituent subsystem or service thereof, is well-defined, self-contained, and does not depend upon the context or state of other services, whether they be duplicate, complementary, cooperative, or a service that sources, consumes, or modifies information from others.

The system 100 and components servers and monitors are preferably enabled using any of a number of internet and web application frameworks, and convenient combination thereof. Some of the more well-known frameworks have been found to work especially well for purposes of implementing the system 100. For example, while a number of proprietary and open source frameworks have been demonstrated to be effective, the frameworks that embrace and enable C++, Java and JavaScript, PHP, and the many well-support user communities are recommended for purposes of the system 100. Preferably, the Phalcon, Laravel, CodeIgniter, Yii, and Symfony and Symfony 2 PHP frameworks have enabled the contemplated system 100 to be configured in new ways that vastly improve response times, high & low-demand scalability, and the ability to incorporate back-end data management and VPN/public domain network communications infrastructures. Of particular import, the system 100 in its various configurations has benefited from the expandability of these frameworks, which enable highly customizable aspects for greatly improved use of complementary technologies.

Such complementary technologies used for purposes of implementing system 100, include, using Symfony as an illustrative example without limitation, AJAX (asynchronous JavaScript and XML[extensible markup language]), HTML and CSS (hypertext markup language and cascaded style sheets), MVC, JSON (JavaScript object notation), and DOM (document object model) classes that enable improved dynamic display of data for improved user interactions. The system 100 and its components make efficient use of what those skilled in this field know as an XMLHttpRequest object, which enables the mobile application 800 and its users to experience markedly improved speed and response times, even on slow mobile communications networks. The XMLHttpRequest enables asynchronous data exchange without the need for full page reloads, between the mobile application 800 and the system 100 components that include the directory search monitor 110, the mobile entity monitor 200, the media server 300, the geocoder 400, and the host network server 500.

The mobile application 800 and the system 100 components and subsystems also are configured to further improve speed and reliability in preferred configurations that specifically employ the MVC sub-framework to incorporate the DRY (do not repeat yourself) coding philosophy, which when combined with the independence of each SoA service ensures a much more reliable fault-tolerant system 100 wherein primary, secondary, tertiary, and other duplicate spawned services, can fail safely and be terminated, without any effect on other services, which operate independently. In this way, if a service is operating as a supplier or a consumer of data and resources from another service that fails, the supplier or consumer services can simply renew their request(s), which can then be met by another operating service without delay.

As a further example, again using the Symfony framework as an illustrative example without intent to limitation the scope of the system 100 as claimed, the various system 100 servers and monitors, including the directory search monitor 110, the mobile entity monitor 200, the media server 300, the geocoder 400, and the host network server 500, are thus able to incorporate a number of very effective, high-speed, highly-reconfigurable, back-end data storage technologies. One of the various problems that persist in the implementation and use of mobile media communication systems, such as system 100, is that the data requested by applications, such as mobile application 800, changes rapidly: the rapid change or high data volatility occurs from both the server side wherein new data that is responsive to a particular request changes due to source data changes, and the data that the application 800 seeks changes as the requests change.

As a result of the many changes to data, each of the system 100 components, including the directory search monitor 110, the mobile entity monitor 200, the media server 300, the geocoder 400, and the host network server 500, must incorporate the capability to accommodate the continuously changing data and the requirement to rapidly communicate the data in its present state with the lowest possible latency, all while preventing data loss (optimized reliability) and while enabling data protection (maintaining data durability). Many such data management and storage technologies exist that could be incorporated for purposes of enabling system 100.

Persons knowledgeable in the field of data storage technologies have come to understand that legacy proprietary and open source database technologies such as hierarchical and relational databases experience short-comings when used in applications with high data volatility where data changes continuously and must be communicated in a present state rapidly on-demand. Hierarchical databases organize data into tree-like structures with tables of records connected by links between tables. Relational databases (RDBs) and RDB management systems (RDBMSs) typically offer less than optimal performance in such environments. RDBs are characterized in that they store data and information about how the data is related in flat, two dimensional tables that embody the relationships between the data.

While many tables can be used in such databases to define such links and relationships, a query request can take too much time to process, as the engine traverses the various tables, links, and relationships, to generate a response. Even though some attempts have been made to improve response times, such as by implementing structured query language (SQL) schemas or paradigms, such attempts have been implemented without any single standard approach, which has made it challenging to use such technologies. These issues have become even more pronounced with the exponential rise of requirements for more real-time capable database systems that are needed for mobile media applications such the mobile media communication system 100 and its complementary mobile application 800.

This is mostly because every resultant SQL-compliant database has adopted its own interpretation of the generic SQL schema, and thus has its own set of peculiarities, benefits and shortcomings, which in combination still have not enabled use for the high-rate data change and communication requirements of the present system 100. Such shortcomings have given rise to a new paradigm of non-relational databases, which are often referred to as NoSQL databases (known as both No SQL and Not Only SQL). The NoSQL databases organize data using methods other than the table, link, relationship, SQL legacy constructs, yet maintain some aspects of compatibility with legacy SQL query constructs. These new NoSQL technologies are also well-suited to the on-demand, lack-of-demand up and down scalability preferred in the IaaS, PaaS, iPaaS, cloud-based architectures preferred for use in the present system 100.

For example, many types of open-source, distributed, NoSQL technologies are presently available and are readily adapted for use in the real-time, high-demand, system 100. There are four primary types of such NoSQL system that include document, column, key-value, and graph technologies. What has been found to be most effective for purposes for purposes of system 100 are the "key-value" class of NoSQL databases, which include a number of well-known proprietary and open source systems: Aerospike, FoundationDB, MemcacheDB, Dynamo, Redis, and Riak, among others. For illustrative purposes in technically describing the system 100, the open source Redis key-value database is contemplated here, as it has developed a large support community, and many application programming interfaces (APIs) that enable use with a variety of complementary technologies, such as the PHP web application frameworks described elsewhere herein.

The mobile media communications system 100 has the particular requirements of needing real-time or near real-time response times for communicating continuously changing media, being sourced from millions of media owners, in response to millions of requests over short periods of time between millions of dynamic and static entities. These general, top-level requirements in turn generate the need to extremely fast database response times, which often requires that the database maintain data in a cached dataset resident in high-speed random access memory (RAM) of the servers and monitors of system 100, including of course the directory search monitor 110, the mobile entity monitor 200, the media server 300, the geocoder 400, and the host network server 500.

Other derived requirements for system 100 include the need to ensure data persistence and durability even though the data must be maintained in high-speed RAM, which requires a mechanism whereby RAM-resident data can be written to a more permanent storage medium, even though the data may be continuously changing. Further, it is required that any such implementation must be compatible for use in the similarly required cloud-based iPaaS, PaaS, IaaS, and SoA architecture described elsewhere herein. This requirement ensures fail-safe, automated fail-over data protections can be implemented to guarantee data preservation and request responsiveness in the face of inevitable hardware, software, and network failures.

It is also preferred that RAM and disk storage data can be accommodated in response to scalable demand in the cloud-based environment, with manageable master-slave, slave-master RAM and disk arrangements. With the contemplated NoSQL, RAM-resident, disk-storage backed arrangement, it is also preferred that the database system enable and be readily compatible with an integral key hashing technology that enables very high-speed collision-free key generation To implement these requirements and to enable the management, communication, storage according to the present mobile media communication system 100, we illustratively describe the system 100 components using the open source Redis NoSQL database system as an example. While meeting most of these requirements, the Redis database has been highly customizable to accommodate the system 100. However, some of those skilled in the field have determined that many RAM-resident NoSQL systems are only recommended for use with data sets that have a predictable or foreseeable size.

For mobile media communication systems like system 100, it has been seen that the total data set size for the enterprise system can be unpredictable in that high-demand times can require seemingly random high limits, while low demand times can see virtually no demand. Consequently, it has been difficult to properly predict high-demand data set sizes to enable predictive accommodation on-demand in time to prevent system overload, non-responsiveness, and catastrophic failure, which would otherwise cause the system to stop operating, until it can be restarted.

However, the mobile media communication system 100 has been implemented on the above-noted cloud systems in combination with the real-time Redis or similarly capable NoSQL database in a virtual machine (VM) clustered configuration wherein the RAM of each VM can be similarly clustered to enable the various Redis databases to be rebalanced in both the RAM resident and disk stored configurations. In the example of a Redis implementation, many auto balancing options are integrally available or easily coded to enable database volatility load and persistence requirements to drive the re-partitioning/data sharding across master-slave persistent and semi-persistent, and or snap-shotting implementations. As the database grows and shrinks as demand rises and dissipates, the hosting cloud infrastructure system are preferably configured to automatically spawn new clusters, and de-cluster and terminate unneeded VM images and RAM profiles on-demand to accommodate the needed resource loads, and to dissociate unneeded resources to minimize costs.

Described differently, in combination with the NoSQL data management capability, and on-demand up-and-down scalability of the cloud-based iPaaS, PaaS, IaaS architecture, the system 100 can replicate VMs and expand RAM upon demand (and terminate and release resources), and the Redis-database-based monitors and servers of system 100 can adjust, growing and shrinking, in unlimited ways, so long as the CSP can maintain its advertised on-demand availability and scalability.

With each of these technologies, requirements, and capabilities in mind, and with continuing reference to FIG. 1, and now also to FIG. 2, more detailed descriptions of the capabilities of the mobile media communication system 100 are explained. In operation, the directory search monitor 110 is implemented to receive simultaneous and or sequentially queued requests for data from any of a number of entities, which can include dynamic requests 120 from mobile or dynamic entities D, and static requests 130 from stationary or temporarily fixed static entities S. Typically, such requests will be transmitted from an internet browser from the static and dynamic entities S, D, over an internet communications network.

For example, any off-the-shelf internet browser might be hosted on a mobile/dynamic device D or a static device S and send the respective dynamic or static requests 120, 130 and navigate to an exemplary website having a standard uniform resource locater (URL) such as www.shopyourlocal.biz. The request would be handled initially by the respective service provider, whether it be an internet service provider (ISP) hosted by a dynamic/mobile device provider such as Verizon®, Sprint®, AT&T® or another, or a land-based ISP such Time-Warner®, FIOS®, or many others.

Each or any of these ISPs would send the requested URL to domain controller and or name server integrated into their respective proprietary networks, or a top-level domain name server maintained by one of the many internet backbone service providers. By any of these means, the URL would be mapped and translated to a standard TCP/IP numerical address of 23.101.190.4, which at the time of this application is hosted by the Microsoft cloud service known presently as Azure, out of one of their Texas-based cloud infrastructure and data warehousing locations.

The directory search monitor 110 in this example would respond to either request with a website data bundle encoded with various data and JavaScript code modules bundled therein that enable the XMLHttpRequest and or iframe asynchronous interactive object capabilities (depending upon whether the requesting browser enables HTLM5 or legacy technologies) contemplated by the various elements of system 100, which enable portions or subframes of a composited webpage to be updated and interactively used, without the need to reload the entire website page. Preferably, each of the dynamic and static requests 120, 130 will include respective, embedded geographic locations 125, 135 of the requesting entities D, S.

If the locations are not included, and if the hosted browser and the entities S, D are so configured, the directory search monitor 110 will request and may receive the embedded geographic locations 125, 135 of the entities S, D that sent the requests, which geographic locations will be communicated by the directory search monitor 110 to other components of system 100. In the alternative, and in the absence of receiving a usable geographic location 125, 135, the directory search monitor 110 may be further configured to estimate a geographic location by reverse TCP/IP address lookup in combination with other information available to the monitor 110, which may include polling other resources for location information derivable from available browser cookies, entity MAC addresses, and public user information resources that may track such data and associate geographic information thereto. The directory search monitor 110 may also be configured to embed the received or estimated locations into the requests 120, 130 for communication to other components of the system 100.

The system 100 is also configured with the mobile entity monitor 200 communicatively coupled to the directory search monitor 110 and the other system components. The mobile entry monitor 200 is primarily configured to receive a mobile entity request 140 from a mobile entity M. The request 140 preferably includes a temporal mobile location 145, which includes a time, if available, as well as the geographic location data. The time data, if available, can be used to enable further aspects of the system 100, which can be configured to timely push media to the mobile entity M when it is near certain locations of interest thereto. With capability similar to that of the directory search monitor 110, the mobile entity monitor 200 can be configured to poll for or estimate the geographic location upon receipt of the mobile request 140, and to embed the location however obtained or estimated into the temporal mobile location 145 for communication to other components of the system 100.

The mobile entity monitor 200 may also be configured to receive predetermined categories of interest 150 and one or more favorite categories 155 or favorite websites 160, in connection with, as part of, and or independently from receiving the temporal mobile location 145. The communication of such information from the mobile entity M is controlled thereby and may be communicated to the mobile entity monitor 200 upon request, automatically, or as may be otherwise controlled by predetermined or adjustable settings on the mobile entity M.

The mobile media communication system 100 also includes a media server 300 that communicates with the directory search monitor 110 and mobile entity monitor 200, and the other components of the system 100. The media server 300 is configured to receive, store, search for and identify media 305 that is geotargeted and of interest to and relevant for communication to the dynamic, static, and mobile entities D, S, M. The media server is also adapted to receive at least one of the dynamic, static, and mobile entity requests 120, 130, 140 and locations 125, 135, 145, and to communicate this information with embedded location coordinates and data to other components of the system 100.

The media 305 received, stored, searched, retrieved, and communicated typically includes a large variety of volatile, continuously updated, media 305 that usually will include geographic region data and or geographic location information or data 310. The embedded or associated geographic data 310 enables the media 305 to be geotargeted for communication to the dynamic, static, and mobile entities D, S, M that may most benefit from receiving such media, and or which entities are targeted to receive such media 305. The received and stored types of media 305 create a compendium thereof and establish a plurality of different geotargeted media 315.

Such geotargeted media 305 can include images, graphics, text, location and or geographic region data or geotargeting data or location information 310, multimedia information such as video and audio, among other types of data. In other alternative adaptations, the media 305 will also include subject matter category data 320, media type 325, media size and position preferences 330. The media type 325 can specify attributes of style, and whether the media 305 format is a graphic image, a video clip, an audio clip, or another type of multimedia, which can enable the system 100 to further amplify the relevance of the media 305 to be communicated. With respect to the media size and position preferences, the media server 300 communicates the position information and preferences 330 to separately position each media item 305 into pre-defined positional zones about a media canvas 335 to have predetermined arrangements. The media canvas 335 establishes a predictable way wherein different formats and types of media 305 information can be placed, positioned, overlaid, and dynamically movable with respect to the media canvas 335.

The media size and position preferences 330 also enables the media server 300 and other components of system 100 to queue the media 305 into certain predetermined positions on the media canvas 335 for use in responses such as web pages that may be communicated in response to the requests 120, 130, 140. The media server 300 receives and is further configured to utilize the dynamic, static, and mobile requests 120, 130, 140, and the respective locations 125, 135, 145, and to compare this data to the geographic data 310 and the category data 320 to enable communication of media 305 that is thereby geotargeted and subject matter relevant to the requests 120, 130, 140 from the entities D, S, M.

The media server 300 is also configured to receive, store, search for, retrieve, and communicate geotargeted media 305 that incorporates a media push tag 340. This push tag 340 may be incorporated into or as part of metadata with or as part of the geotargeted media 305, or which can be encoded or otherwise embedded as part of the geotargeted media 305 other data and information elements. The push tag 340 preferably includes a dated time limit 345 and a discrete impression count 350. The dated time limit 345 can be used by the media server 300 to specify or otherwise establish a time period during which the geotargeted media 305 can be communicated, and where at times outside the time period, the geotargeted media 305 may be classified as expired so it will not be communicated. In this way, only media 305 with unexpired time limits can be retrieved and communicated. The impression count 350 is used by the media server 300 as another means by which to amplify the relevance of the communicated media 305 as a function of preferred periods of time, and to only communicate the geotargeted media 305 a certain number of times that does not exceed the count 350, where after the media 305 is deemed exhausted. Each time a media item 305 is embedded and communicated from the media server 300, the count 350 is decremented.

In additionally preferable arrangements, the media server 300 is also adapted to overcome the problems associated with entities using various types of media blocking methods, which are the result of entities D, S, M being inundated with media that is irrelevant both from a geographic location and subject matter category perspective. The media server 300 is adapted to overcome this obstacle in one of a number of ways.

One such adaptation of media server 300 searches for relevant media 305 as noted, and instead of communicating the media 305 directly in response to the requests 120, 130, 140, the media server 300 instead first embeds or composites the media 305 into a data bundle or data stream 360 in a pre-rendered format such as a webpage ready to display, before communicating the data bundle 360 in response. By pre-rendering the media 305 into and as part of the data stream or bundle 360, the media server 300 ensures or at least greatly improves the probability the media 305 will be communicated to and displayed by the entities D, S, M, without being blocked before display.

This also greatly improves the effectiveness, speed of display, and operation of media delivery to the entities D, S, M, prevents incorrectly displayed information that is communicated from system 100, and ensures that the system 100 is configured to improve the experience of users. The pre-rendering of media 305 and other information into the data bundle 360 is done by the media server 300 or other higher-speed and higher processing power components of the system 100, before communicating the data bundle 360, instead of having to be accomplished by the likely less capable electronic devices such as entities D, S, M.

The media server 300 may use any number of techniques to also precisely position and arrange the media 305 or a series of such media 305 forming the plurality of media 315 into a combination of such data streams or bundles 360. The media server 300 then communicates this data bundle 360 to another component in system 100, such as directory search monitor 110 or host network server 500. These components 110, 500 may then embed further data into the data bundle 360 so that the media 305 is masked and forms a part of a larger response, such as a website page, to the requests 120, 130, 140; as before, the media 305 being embedded and or masked in a pre-rendered format, which also greatly speeds up the display of the larger response being communicated to entities D, S, M for interactive use and display. This capability prevents the media 305 from being inadvertently or undesirably blocked by the entities D, S, M, or applications be executed thereon, thus further amplifying the relevance of the media 305 for the benefit of the geotargeted and subject matter relevancy targeted recipients.

The media server 300 is also configured to communicate the data bundle or streams 360 to, and or receive and or retrieve from the host network server 500, at least one network site 505 from a plurality of network sites 510 stored on the network server 500. The host network server 500, among other capabilities, receives, stores, retrieves, and communicates the network sites 510 in response to requests from other subsystems of system 100 and other requesting services or entities. Each network site will typically include geographic location data 515, and category data 520 that classifies the network into one of a series of subject matter categories that correspond with the media categories data 320.

In this particular configuration, the media server 300 is further configured to generate one or more of the composited or embedded data bundles 360, which embed the geotargeted media 305 in combination with the at least one network site 510, in the pre-rendered configuration. Once composited, embedded, pre-rendered, and packaged into the data bundles 360, the media server 300 is adapted to communicate the one or more composited, pre-rendered data bundles 360 as responses to the requests 120, 130, 140. In further possibly preferred arrangements, the media server 300 is also preferably configured to optionally communicate the composited data bundles 360 directly to at least one of the directory search monitor 110 and mobile entity monitor 200, and or other elements and components of the system 100, for subsequent communication to the entities D, S, M.

A geocoder 400 is also included in the system 100, and may be in communication with, coupled to, and or a part of the media server 300, or other components of the system 100. The geocoder 400 is preferably configured to receive a geographic location, grid identifier, coordinates, in any of many possible forms, such as by requests 120, 130, 140, or as otherwise described herein. The geocoder 400 is also configured to enable conversion of any received locations, for example, the static, dynamic, and temporal mobile locations 125, 135, 145, between different types of geographic location data and or coordinates.

Examples of geographic location information can include latitude and longitude coordinates, postal codes, street address, region names or identifiers, geographic information system (GIS) grid, plat, parcel, property, feature, and other identifiers, and geographic grid locations such as those associated with universal transverse Mercator (UTM), Universal Polar Stereographic (UPS), military grid reference system (MGRS), and many other types of geographic coordinates.

The geocoder 400 is further configured upon receipt of a location, such as dynamic, static, and temporal mobile locations 125, 135, 145, to generate for each location a geozone designator 410, which is preferably generated and normalized into a unique integer value. The geocoder 400 is configured to use the received locations 125, 135, 145, and the respectively generated geozone designators 410 as grid-centers, used to generate a grid 420 of geozones 430 of nearby geographic locations, with each generated geozone 430 in the grid 420 also having a unique geozone designator 410. More specifically, the geocoder 400 uses the received locations and generated designators 410, to generate a grid 420 of equal area isometric, adjacent geozones 430 each having respectively assigned geozone designators 410. In addition to generating the geozone designators 410 for each received location 125, 135, 145, the geocoder 400 is also configured to generate geozone identifiers 440 for each geographic location data 515 of the network site 505, and for the geographic data 310 for each media item 305. As with the geozone designators 410, the geocoder 400 is also adapted to generate the geozone identifiers 440 as integer values that are computed from the geographic locations or data, whether such locations are defined by geographic coordinates, grid locations from other grid or gridding systems, specific addresses, zip codes, and place names such as towns, cities, boroughs, neighborhoods, counties, and similar naming conventions.

The grid 420 generated by the geocoder 400 is arranged to include a centrally positioned geozone 430 that includes the received location (one or more of locations 125, 135, 145), which has been assigned the computed or generated geozone designator 410. In other words, each geozone 430 of the generated grid 420 is assigned a calculated, respective unique geozone designator 410, which for the received location(s), is the grid-central, grid-centered, or centrally positioned geozone 430. The geocoder 400 also preferably generates the grids 420 of equal area geozones 430 whereby each geozone 430 has isometric, predetermined polygonal and or rectilinear dimensions that circumscribe and define the area of each resultant polygon or geozone 430.

In another aspect of the present system and method, the geocoder 400 is configured to generate the grid 420 to have the geozones 430 generated within the grid 420 and positioned adjacently with each other geozone 430. The adjacent positioning also surrounds the grid-centered or center geozone 430, which includes or contains the centrally positioned static, dynamic, and or mobile locations 125, 135, 145. Illustrated differently, geocoder is also further configured to generate the grid 420 to have at least a predetermined number of geozones 430, which are adjacently arranged with each other and around the grid-centered geozone 430.

It may be even more useful and preferable in certain configurations of the geocoder 400, such that the geocoder 400 generates the grid 420 to have a group of geozones, perhaps at least nine geozones 430, or more if preferred, arranged substantially in rows and columns, for example 3 rows and 3 columns, with the location centrally positioned in a center grid or grid-centered geozone 430 of the nine. The substantially isometric dimensions of each geozone 430 in the grid 420 may have a predetermined and or adjustably configured dimension, for purposes of example only, of one mile, one kilometer, ten miles, or ten kilometers, or any other preferred dimension or in any other unit system. In other alternative arrangements, the grid 420 may be established to have non-rectilinear configurations, and may instead or in combination use concentric circular grids having radii some preferred, pre-established, or predetermined distance, and having each circular element of the curvilinear grid being segmented into pie slices or secant sections bounded by inner and outer circular segments and two radii set apart by a selected angle.

The system 100 also further incorporates the host network server 500 that is communicatively coupled to the media server 300, and the directory search and mobile entity monitors 110, 200, and other components of system 100. The host network server 500 receives, normalizes, parses, stores, retrieves, and communicates the network site information 505, and is configured, among many various capabilities, to generate unique network site keys 530, and to also communicate to and receive from the media server 300 the geotargeted media 305 and previously generated network site keys 530 retrieved during media server searches described elsewhere herein. The network site keys 530 are initially generated by the host network server 500 and or its components and subsystems, and the keys 530 are used to and enable rapidly look-up network site information from a network site repository 500, 510.

As previously described in other contexts, the host network server 500 will similarly encounter high data volatility and will need to minimize latency when searching for, retrieving, and communicating requested network site information 505. Accordingly, an optimized configuration of the host network server 500 will incorporate one or more of the NoSQL or non-relational database, key-value systems already described. This implementation will be best served in combination with using the on-demand resource scalability available from the noted, exemplary CSPs.

Each of the configurations of the system 100 described herein are also compatible for further variations the implement the media server 300 being configured to receive, retrieve, and communicate the geotargeted media 305 after searching the geographic data 310 for geographic proximity, range, distance, or proximity range, or range of proximities to the locations 125, 135, 145 of the requests 120, 130, 140. The media server 300 accomplishes the search by comparing the geozone designators 410 with the geozone identifiers 440 for network sites 505 and media 305. Since the media server 300 must only compare the integers that define the geozone designators 410 (for locations 125, 135, 145) and identifiers 440, the comparison is rapid. As those skilled in the technical field should be able to comprehend, the exemplary dimensional arrangement of the geozones 430 and the assembled grids 420 enables the media server 300 to quickly calculate approximate distance, range, proximity, proximity range, or range of proximity range values between the dynamic, static, and mobile locations 125, 135, 145 and the geographic location data 310 of the media 305 and the locations 515 of the network sites 505.

The media server 300 can thus calculate distance or proximity range and retrieve and communicate geotargeted, responsive media 305 and geographically proximate network sites 505 by utilizing minimal computing resources and with very low latency, despite the need to process millions of requests 120, 130, 140 and to search through potentially millions of media items 305 and network sites 505.

For purposes of continued illustration using a different explanation, the geotargeted media 305 and the network site keys 530 are selected, retrieved, and communicated if they have geographic location data 310, 515 proximate to the received locations 125, 135, 145. Such geographic proximity, distance, range, or proximity range is another way to measure geographic relevance or preferred geotargeting. The simplest case to assess for closeness or distance or proximity is accomplished if the location or location data 515 of the network site keys 530 and or the geotargeted media 305 location data 310 have respective geographic or geozone identifiers 440 that equal the geographic or geozone designator 410 of any of the geozones 430 of the generated grid 420. By implementing a geozone identifier 440 and designator 410 coding schema whereby adjacent geozones 430 have generated or computed integer values that are within some predetermined range of one another, adjacent proximity, distance, closeness, or proximity range can be readily calculated without the need for more complex, computing resource intensive geographic distance and unit conversion computations.

The media server 300 also contemplates configurations wherein the media server 300 is customized to generate, store, retrieve, communicate, and calculate a weighting 370 for the geotargeted media 305 and for the network site keys 530, as a function of the constituent data elements for each. The computation of the weighting 370 enables the plurality of geotargeted media 315 and network sites 510 to be compared for ranking the members of the plurality 315, 510 as a function of the data contained therein and with the data contained in the requests 120, 130, 140. In this way, the media server 300 can establish an amplified geotargeted and subject matter (category) relevancy of the media 305 and network sites 505 to be communicated in direct context of the requests 120, 130, 140.

More specifically, the weighting 370 is calculated and the relevancy determination is made by comparing the informational aspects of the media 305 and network sites 505 to the location and category information received in the requests, 120, 130, 140. The information dimensions compared include the locations 125, 135, 145 versus the locations 310 510, the predetermined categories of interest 150, the favorite categories 155, and the favorite websites 160.

For example, if the range of possible weightings 370 span 0% on the low end to a high end of 100%, a sample weighting can be calculated wherein when locations 125, 135, 145 have geozone designators 410 that match a geozone identifier 440, a first relevancy parameter 375 may be set to equal 100%. If instead there is close proximity or a small distance between the locations 125, 135, 145 to such adjacent geozones 430, then the Pt relevancy parameter 375 might be calculated as 75% or any other preferred set point. A proximity, distance, or proximity range that is farther than some predetermined or pre-established or preferred proximity range and outside of this preference, then the Pt relevancy parameter may be set to 0% (zero percent), which establishes irrelevancy or otherwise excludes media 305 and network sites 505 that are beyond the preferred distance and proximity range(s), and too far from the locations 125, 135, 145. Similarly, calculating the relevancy of the categories between the requests 120, 130, 140, and those categories 320, 520 of the media 305 and network sites, can calculate analogous values to be applied to a $2^{nd}$ relevancy parameter 380. Comparing the other data items can set values of $3^{rd}$ and nth relevancy parameters 385, 390. The weighting 370 can then be computed by summation and averaging or any of a host of various methods, that may include further weightings applied to each of the relevancy parameters.

In another illustrative configuration that may be used alone or in combination with those elsewhere described, the weighting 370 may be further calculated whereby the nth relevancy parameters are computed or generated from a predetermined cross-tabulation array of categories 395 having preset relevancy weightings established in the table. For example, the cross-tab 395 might have the same categories across a row axis and a columnar axis. For row-column intersections of identical categories, the nth relevancy parameter might equal null or 0% (zero percent).

For similar but not identical categories, the row-column intersection might equal 80%, which may be sensible for a vehicle dealership row intersecting a tire or vehicle repair entity. But a vehicle dealership row that intersects an unrelated category such as a bakery ought to have a 0% relevancy. So if all possible categories numbered 300 as an example, the cross-tab table would have 300 rows and 300 columns, establishing 90,000 intersections, with 300 identical category intersections having 0% relevancy.

In this way, the weighting calculation 370 is configured to optimize the relevance of geotargeted media 305 and network sites 505 that are communicated in response to the various requests 120, 130, 140. This preferred relevancy determination enables precise, targeted, and focused media 305 and network sites 505 to be identified, selected, and communicated in response to the requests 120, 130, 140, whereby the media 305 and network sites 505 to be communicated will thereby have an optimized weighting 370 and amplified relevance to requests.

In yet another modified configuration the media server 300 is further configured to use the accumulated statistics 630 to adjust the relevancy parameters 375, 380, 385, 390, and 395, to thereby further adjust the weightings 370 to communicate media 305 and network sites 505 that are most of interest to entities D, S, M. In a further example for purposes of illustration, but not limitation, the media server 300 can be further configured to automatically update the weightings 370 for media 305 and network sites 505 as a function of how many times the dynamic, static, and temporal mobile requests 120, 130, 140 are received with additional information that substantiates higher levels of interest.

More specifically, in these expanded modifications of the preceding configurations, the requests 120, 130, 140 may be further adapted to include media click categories 170, searches categories 175, and demographics 180 that can be self-identified by users of the entities D, S, M. Further, the media server 300 and or the data analytics engine are individually and or cooperatively configured to accumulate this request data 170, 175, 180 as the accumulated statistics 630. Additionally, the directory search monitor 110, the mobile entity monitor 200, the host network server 500, and the management servers 600, 610, 700 may gather this information 170, 175, 180 from the requests 120, 130, 140, or from independently monitoring and accumulating data and statistics from listening to request communications traffic passing through system 100.

In any of these configurations that gather and accumulate the accumulated statistics and data 630, the media server 300 is configured to automatically and in real-time continuously or periodically modify the nth or nth+1 relevancy parameters 390, and updated the predetermined cross-tabulation array of categories 395 with new relevancy weightings. The updated relevancy weightings in table 395 and relevancy parameters 390 and nth+1 would be increased for categories having higher media clicks 170, for increased counts of search categories 175, and or for categories that experience increased interest from certain aspects as evidenced by the demographic data 180. Similarly and in contrast, such relevancy weightings in the table 395 and relevancy parameters 390 could also in some cases be decreased over some predetermined and suitable period of time in the absence of such media clicks 170, counts of search categories 175, and or for categories that experience no or decreased interest as evidenced by certain aspects of the demographic data 180

In configurations that adopt these real-time response, automatic relevancy updates, the system 100 can thereby be implemented with a machine-learning capability that continuously adjusts up and down the relevancy parameters 375, 380, 385, 390, 395 and in turn the weightings 370 for media 305 and network sites 505, as a direct and real-time function of how entities D, S, M are responding to the media 305 and network sites 505 that are being communicated to the entities D, S, M.

In contrast and in other exemplary configurations, and as those skilled in the field might surmise or deduce from the preceding examples, the weighting 370 may also be configured to prevent communication of unwanted or otherwise undesired geotargeted media 305 or network sites 505. For example, it may be desired that geotargeted media 305 of certain types, categories, and having certain locations should not be communicated in response to certain requests from locations too far away or not in some preferred, pre-established or predetermined proximity range or distance. For a specifically requested network site 505, the media server 300 may be configured whereby geotargeted media 305 is selected from a group or plurality of geotargeted media 315 such that each media item 305 has a media category identifier 320 that is not equal to the network site category identifier 520 of the network site 505. This capability can prevent the unwanted results of having media 305 embedded into the data bundles 360 that directly competes or conflicts with the information contained in the network site 505.

The host network server 500 is further configured to receive the network site data 505 with the media push tags 340 described elsewhere herein, which have the noted time limit and impression count data 345, 350. The media server 300 is this arrangement is also adapted to communicate the media push tags 340 directly to the host network server 500, or any of the other components of the system. Here, the media server 300 also retrieves and generates the above-described weighting 370 for the geotargeted media 305, by also calculating the nth relevancy parameter using an unexpired and elapsed time within the time limit 345 and expended impression count from the impression count 350. The media server 300 can thereby retrieve and communicate geotargeted media 305 in response to requests 120, 130, 140, more often when there are unexhausted impression counts 350 and a limited or short amount of time left in the time limit 345 to expend those impression counts 350.

Additional configurations of the mobile media communication system 100 also include a management server 600 that is configured to manage resources across the system 100 and during operation of the methods. The management server 600 is further adapted to enable data acquisition including network site data 505 and related information 510, 515, 520. The management server 600 is also enabled with the capability to normalize and store the acquired network site data 505 by parsing the acquired data into a standardized format and arrangement this is forcibly consistent across all network sites 505 so as to further optimize use of the NoSQL schema.

The management server 600 may be preferably configured to manage a specific and predetermined, limited geographic region for the mobile media management system 100, and may be replicated for use in adjacent and remotely located geographic regions. The management server 600 is coupled to and configured to communicate with the media server 300, the host network server 500, and the directory search and mobile entity monitors 110, 200, among other components. The management server 600 is also configured to receive media 305 having geographic location data 310, category data 320, and related information, and to communicate such to and from the other system components.

The management server 600 is also reconfigurable or can be replicated to operate as an inter-regional server 700 that is configured to manage the regionally adapted management servers 600. (FIG. 1). As with the servers 600, the inter-regional server may incorporate one or more inter-regional domain controllers and name servers 705.

The mobile media communication system 100 is also implemented to operate with, include, and enable a mobile application 800. The mobile application 800 is configured interact exclusively with the system 100 in various optimized and customize ways so as to maximize responsiveness and utility. One configuration of mobile application 800 enables direct access to the management servers 600, 610, 700 to facilitate management of network site data 505 by mobile entities M that may be authorized for such capability. In other more ubiquitous aspects, the mobile application 800 is optimized to periodically communicate with the host network server 500 directly or through the mobile entity monitor 200. In turn, this capability enables communication with the directory search 110 and media server 300, and the other components of the system 100. The mobile application 800 is also configured, among other capabilities, to periodically and on demand to retrieve a temporal location TL with geographic coordinates and or related data, to store category and favorite preferences, and to periodically communicate the temporal location as a temporal mobile location 145, and the predetermined preferences such as categories of interest 150, favorite categories 155, and favorite websites 160.

Any of the preceding implementations may be configured for operation in wide range of physical and architectural arrangements as can be understood from the preceding descriptions, and various figures in connection with FIG. 6, which is an illustration of a data processing system 1000, in accordance with an illustrative arrangement of the mobile media communication system 100. The data processing system 1000 may execute some of the capabilities previously described, and is an example of a system computer 1000, upon which elements of the mobile media communication system, methods, and related applications, code, and modules may execute. Storage devices 1010, such as memory 1020, permanent storage 1030, or computer readable media 1040 may store code 1110 for the system 100 of FIGS. 1, 2, 3, and 4. Any of the memory, persistent storage, or computer readable media may be a non-transitory computer readable storage media 1120. In turn, computer program product 1300 and program code 1110 could implement one or more elements of the system 100.

The data processing system 1000 includes a communications infrastructure 1200, which enables communications between the processors 1050, memory 1020, persistent storage 1030, communications unit 1060, the input/output (I/O) unit 1070, and the displays 1080.

Processors 1050 serve to execute instructions for software that may be loaded into memory 1020, which together may also be spawned and operate as the aforementioned VMs in addition to being configured as physical units. Software loaded into memory 1020 may include the systems and components of system 100, which may be executed on the processors 1050 and memory 1020 to implement, for example, the various capabilities and operations described and illustrated in connection with FIGS. 1, 2, 3, 4. The processors 1050 may, for example, execute instructions for the mobile media communications system 100 and methods for calculating the weights 370, and for embedding the media 305 into data bundles 360, and for communicating information between the various resources. The higher powered, and larger number of processors 1050 also enable the pre-rendering of the media 305 and network sites 505 into the data bundles 360 before communication to the entities D, S, M so as to improve the operation of system 100 wherein the less capable and lower speed processors of the entities D, S, M only need to display the communicated data bundles 360 without having to decrement performance and resources to rendering.

The communications unit 1060, and communications infrastructure 1200, in these example implementations, enables communications with other VMs that enables various components of system 100 as such are scaled up, and terminated during periods of lower demand, any of which may be implemented across different geographic locations and across different communications and computing systems across the contemplated enterprise cloud infrastructures and architectures. The communications infrastructure 1200 and unit 1060 may send or receive data, instructions, and other electronic media from any of the described systems, executing methods, and the various user desktops, laptops, handheld devices, and other devices in operation with the entities communicating with the system 100 during operation.

The input/output (I/O) interface 1070 enables for input and output of data with other devices that may be connected to the data processing system 1000 and system 100. For example, the input/output (I/O) unit 1070 may provide a connection for user input through the user interface, a keyboard, a mouse, and or some other suitable input device. The displays 1080 provide a mechanism to display information to an entity D, S, M, or users BA, RA, IRA thereof. The displays 1080 may display results of various operations and interactions to a user of any of the information contemplated and described.

The different components illustrated for the data processing system 1000 are not meant to provide architectural limitations to the manner in which different configurations of the mobile media communication system 100 may be implemented, but only to serve as expanded examples that are to be arranged and used in the context of the system 100 as described. The different alternatives and arrangements may be made using any hardware device or system capable of running program code 1110.

The different illustrative modifications and variations of the exemplary configurations can take the form of an entirely hardware-based adaptation, an entirely software-based system, or a hybrid implementation containing both hardware and software elements. Some variations and modifications are implemented in software, which includes but is not limited to forms, such as, for example, firmware, resident software, and microcode.

Furthermore, the different aspects shown can take the form of a computer program product 1300 accessible from a computer usable or computer readable medium 1040 providing program code 1110 for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The above description refers to systems, methods, components, elements, nodes, or features being in "communication" together. As used herein, unless expressly stated otherwise, use of these terms and words must be understood to mean that one system/method/component/element/node/module/feature is directly or indirectly joined to and or communicates with another, either electronically, mechanically, or in some similar way that enables cooperative operation. Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings are not intended to be construed to limit the description to a given example, time period, or to an exemplary item commercially available in the market as of a specific date and time period. Instead, these descriptions are crafted to be understood by those having knowledge, skill, and ability in the relevant fields of technology and to include conventional, traditional, normal, or standard technologies that may be available now and at any time in the future in some improved and modified form. Similarly, a group of words described and joined with the conjunction "and" or the disjunctive "or" should be understood only as exemplary and representative, but not exclusive groups, and not as requiring that only or each and every one of those described items must be or must not be present in the group. Rather, use of such conjunctives and disjunctives must be understood to mean "and or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated. The presence or absence of broadening words and phrases such as "one or more," "at least," "but not limited to" or other like phrases in some instances must not be understood to mean that narrower meanings are implied, intended, or required.

What is claimed is:

1. A mobile media communication system, comprising:
   directory search and entity monitors configured to receive one or more of: (a) a static entity request containing at least a static location, (b) a dynamic entity request having at least a dynamic location, and (c) a mobile entity request containing at least a temporal mobile location;
   a media server in communication with the directory search and mobile entity monitors, and configured to:
   (a) receive at least one of the dynamic, static, and mobile entity requests and to generate for each location a mobile geozone designator, and at least one of respective static and dynamic geozone designators;

(b) retrieve geotargeted media and network site keys having geozone identifiers (i) equal to or (ii) within a proximity range to one or more of the mobile, static, and dynamic geozone designators, and (c) communicate the retrieved geotargeted media in a response to the requests; and a host network server in communication with the media server and the directory search and mobile entity monitors, and configured to:

(a) receive the geotargeted media and the network site keys from the media server, (b) retrieve from a network site repository at least one network site matching at least one of the network site keys, (c) generate one or more composited data bundles embedding the geotargeted media with the at least one network site, and (d) communicate the one or more composited data bundles as responses to the requests.

2. The mobile media communication system, according to claim 1, further comprising:

the host network server is further configured to communicate the composited data bundles directly to at least one of the directory search and mobile entity monitors; and a geocoder configured to receive the locations and to generate a grid of equal area isometric geozones including a centrally positioned geozone as a grid-center that includes the location, each geozone having the respective unique geozone designators, and the grid establishing the proximity range, and having the geozones positioned adjacently about the grid-center geozone.

3. The mobile media communication system, according to claim 2, further comprising:

a management server coupled to the media server, host network server, and the directory search and mobile entity monitors, and configured to receive media having geotargeting locations, and to communicate the media to the media server; and the media server being further configured to communicate with the geocoder to convert the geotargeting locations into geozone identifiers wherein the geotargeting locations are defined with one or more of a longitude and latitude, a postal code, a street address, and a geographic location.

4. The mobile media communication system, according to claim 1, further comprising:

the media server is further configured to:

(a) receive the retrieved at least one network site from the host network server, (b) generate the one or more composited data bundles embedding the geotargeted media with the at least one network site, and (c) communicate the one or more composited data bundles as responses to the requests.

5. The mobile media communication system, according to claim 4, further comprising:

the media server is further configured to communicate the composited data bundles directly to at least one of the directory search and mobile entity monitors.

6. The mobile media communication system, according to claim 1, the host network server further comprising a network site key and value storage system that establishes unique network site keys mapped to each of a plurality of hosted network sites, wherein the values contain a plurality of data types, and wherein the storage system is configured for durability to be at least snap-shotted or semi-persistent.

7. The mobile media communication system, according to claim 1, further comprising:

a management server coupled to the media server, host network server, and the directory search and mobile entity monitors, and configured to receive network site data having respective locations, and to communicate the network site data to the host network server; and the host network server being further configured to calculate a perfect hash function to the network site data to generate the network site keys to be unique.

8. The mobile media communication system, according to claim 7, further comprising:

the host network server being further configured to communicate the network site keys to the media server with the respective locations, wherein the respective locations are converted into geozone identifiers, and wherein the media server stores the network site keys with the respective locations.

9. The mobile media communication system, according to claim 1, wherein the communicated geotargeted media includes a plurality of different geotargeted media that are composited as data bundles embedding the plurality of different geotargeted media in separately positioned, predefined zones about a canvas in predetermined arrangements with the at least one network site.

10. The mobile media communication system, according to claim 1, further comprising the host network server configured to receive the at least one network site with a category identifier;

the media server further configured to retrieve and to generate a weighting for the geotargeted media, the weighting being calculated with a relevancy parameter generated from a predetermined array of categories which maps the relevancy parameter to a plurality of category identifiers; and to communicate the geotargeted media having the weight exceeding a weighting threshold.

11. The mobile media communication system, according to claim 1, further comprising the host network server configured to receive the at least one network site with a category identifier, and respective static, dynamic, and mobile predetermined category and favorite preferences;

the media server further configured to:

(A) retrieve and generate a weighting for the geotargeted media, the weighting being calculated with (i) a geotargeting parameter generated from the static, dynamic, and temporal mobile locations, and (ii) a relevancy parameter generated from (a) the predetermined category and favorite preferences and (b) a predetermined array of categories which maps the relevancy parameter to a plurality of media category identifiers; and (B) communicate the geotargeted media having the weight exceeding a weighting threshold.

12. The mobile media communication system, according to claim 11, wherein the communicated geotargeted media includes a plurality of different geotargeted media selected from a group of geotargeted media identified to have a media category identifier not equal to the network site category identifier of the at least one network site.

13. The mobile media communication system, according to claim 1, further comprising the host network server configured to receive the at least one network site with a media pushtag having a time limit and an impression count; and the media server further configured to retrieve and communicate the media having a media push tag with an unexpired time limit and unexhausted impression count.

14. The mobile media communication system, according to claim 1, further comprising the host network server configured to receive the at least one network site with category data, a media push tag with a time limit and an impression count;
the media server further configured to
(a) retrieve and to generate a weighting for the geotargeted media, the weighting being calculated with an elapsed time within the time limit and expended impression counts from the impression count, and with a relevancy parameter generated from a predetermined array of categories which maps the relevancy parameter to a plurality of media category identifiers; and
(b) communicate the geotargeted media having the weight exceeding a weighting threshold.

15. A mobile media communication system, comprising:
a mobile application configured to (a) periodically retrieve a temporal location, (b) store predetermined category and favorite preferences, (c) periodically communicate the temporal location as a temporal mobile location, and predetermined preferences;
a mobile entity monitor configured to receive a mobile entity request containing at least the temporal mobile location;
a media server in communication with the mobile entity monitor, and configured to:
(a) receive the mobile entity request;
(b) retrieve geotargeted media and network site keys having geozone identifiers (i) equal to or (ii) within a proximity range to one or more of the geozone designators, and
(c) communicate the retrieved geotargeted media in a response to the request; and
a host network server in communication with the media server and the mobile entity monitor, and configured to:
(a) receive the geotargeted media and the network site keys from the media server,
(b) retrieve from a network site repository at least one network site matching at least one of the network site keys,
(c) generate one or more composited data bundles embedding the geotargeted media with the at least one network site, and
(d) communicate the one or more composited data bundles as responses to the request.

16. The mobile media communication system, according to claim 15, further comprising:
the host network server is further configured to communicate the composited data bundles directly to the mobile entity monitor;
a geocoder configured to receive the temporal mobile location and to generate a grid of equal area isometric geozones including a centrally positioned geozone as a grid-center that includes the location, each geozone having respective unique geozone designators, and to establish the proximity; and
the host network server being further configured to communicate the network site keys to the media server with the respective locations, wherein the geocoder converts the respective locations to generate geozone identifiers, and wherein the media server stores the network site keys with the respective locations.

17. The mobile media communication system, according to claim 16, further comprising:
a management server coupled to the media server, host network server, and the mobile entity monitor, and configured to receive media having geotargeting locations, and to communicate the media to the media server; and
the media server being further configured to communicate with the geocoder to convert the geotargeting locations into geozone identifiers wherein the geotargeting locations are defined with one or more of a longitude and latitude, a postal code, a street address, and a geographic location.

18. The mobile media communication system, according to claim 15, further comprising:
the media server is further configured to:
(a) receive the retrieved at least one network site from the host network server,
(b) generate the one or more composited data bundles embedding the geotargeted media with the at least one network site, and
(c) communicate the one or more composited data bundles as responses to the request.

19. The mobile media communication system, according to claim 18, further comprising:
the media server is further configured to communicate the composited data bundles directly to the mobile entity monitor.

20. The mobile media communication system, according to claim 15, wherein the communicated geotargeted media includes a plurality of different geotargeted media that are composited as data bundles embedding the plurality of different geotargeted media in separately positioned, predefined zones about a canvas in predetermined arrangements with the at least one network site.

21. The mobile media communication system, according to claim 15, further comprising the host network server configured to receive the at least one network site with a network site category identifier, and to receive the temporal mobile location and predetermined category and favorite preferences;
the media server further configured to retrieve and to generate a weighting for the geotargeted media, the weighting being calculated with a geotargeting parameter generated from the temporal mobile location, and with a relevancy parameter generated from the predetermined category and favorite preferences, and a predetermined array of categories which maps the relevancy parameter to a plurality of media category identifiers; and to communicate the geotargeted media having the weight exceeding a weighting threshold.

22. The mobile media communication system, according to claim 21, wherein the communicated geotargeted media includes a plurality of different geotargeted media selected from a group of geotargeted media identified to have a media category identifier not equal to the network site category identifier of the at least one network site.

23. The mobile media communication system, according to claim 15, further comprising the host network server configured to receive the at least one network site with a media push tag having a time limit and an impression count; and
the media server further configured to retrieve and communicate the media having a media push tag with an unexpired time limit and unexhausted impression count.

24. The mobile media communication system, according to claim 15, further comprising the host network server configured to (a) receive the at least one network site with category data, a media push tag with a time limit and an impression count, and (b) the temporal mobile location, and the predetermined category and favorite preferences;

the media server further configured to
(a) retrieve and to generate a weighting for the geotargeted media, the weighting being calculated with an elapsed time within the time limit and expended impression counts from the impression count, with an geotargeting parameter generated from the temporal mobile location, and with a relevancy parameter generated from the predetermined category and favorite preferences, and a predetermined array of categories which maps the relevancy parameter to a plurality of media category identifiers; and
(b) communicate the geotargeted media having the weight exceeding a weighting threshold.

25. A mobile media communication system, comprising:
a directory search monitor configured to receive one or more of: (a) a static entity request containing at least a static location, and (b) a dynamic entity request having at least a dynamic location;
a media server in communication with the directory search monitor, and configured to:
(a) receive at least one of the dynamic and static entity requests and to generate for each location a mobile geozone designator, and at least one of respective static and dynamic geozone designators;
(b) retrieve geotargeted media and network site keys having geozone identifiers (i) equal to or (ii) within a proximity range in the grid to one or more of the static and dynamic geozone designators, and
(c) communicate the retrieved geotargeted media in a response to the requests; and
a host network server in communication with the media server and the directory search monitor, and configured to:
(a) receive the geotargeted media and the network site keys from the media server,
(b) retrieve from a network site repository at least one network site matching at least one of the network site keys,
(c) generate one or more composited data bundles embedding the geotargeted media with the at least one network site, and
(d) communicate the one or more composited data bundles as responses to the requests.

26. The mobile media communication system, according to claim 25, further comprising:
the host network server is further configured to communicate the composited data bundles directly to the directory search monitor; and
a geocoder configured to receive a location and to generate a grid of equal area isometric geozones including a centrally positioned geozone as a grid-center that includes the location, each geozone having respective unique geozone designators.

27. The mobile media communication system, according to claim 26, further comprising:
a management server coupled to the media server, host network server, and the directory search monitor, and configured to receive media having geotargeting locations, and to communicate the media to the media server; and the media server being further configured to communicate with the geocoder to convert the geotargeting locations into geozone identifiers wherein the geotargeting locations are defined with one or more of a longitude and latitude, a postal code, a street address, and a geographic location.

28. The mobile media communication system, according to claim 25, further comprising:
the media server is further configured to:
(a) receive the retrieved at least one network site from the host network server,
(b) generate the one or more composited data bundles embedding the geotargeted media with the at least one network site, and
(c) communicate the one or more composited data bundles as responses to the requests.

29. The mobile media communication system, according to claim 26, further comprising:
the media server is further configured to communicate the composited data bundles directly to the directory search monitor.

30. The mobile media communication system, according to claim 25, wherein the communicated geotargeted media includes a plurality of different geotargeted media that are composited as data bundles embedding the plurality of different geotargeted media in separately positioned, predefined zones about a canvas in predetermined arrangements with the at least one network site.

31. The mobile media communication system, according to claim 25, further comprising the host network server configured to receive the at least one network site with a network site category identifier;
the media server further configured to retrieve and to generate a weighting for the geotargeted media, the weighting being calculated with a relevancy parameter generated from a predetermined array of categories which maps the relevancy parameter to a plurality of media category identifiers; and to communicate the geotargeted media having the weight exceeding a weighting threshold.

32. The mobile media communication system, according to claim 25, further comprising the host network server configured to receive the at least one network site with a network site category identifier;
the media server further configured to retrieve and to generate a weighting for the geotargeted media, the weighting being calculated with the weighting being calculated with a geotargeting parameter generated from the static and dynamic locations, and with a relevancy parameter generated from a predetermined array of categories which maps the relevancy parameter to a plurality of media category identifiers; and to communicate the geotargeted media having the weight exceeding a weighting threshold.

33. The mobile media communication system, according to claim 32, wherein the communicated geotargeted media includes a plurality of different geotargeted media selected from a group of geotargeted media identified to have a media category identifier not equal to the network site category identifier of the at least one network site.

34. The mobile media communication system, according to claim 25, further comprising the host network server configured to receive the at least one network site with a media push tag having a time limit and an impression count; and the media server further configured to retrieve and communicate the media having a media push tag with an unexpired time limit and unexhausted impression count.

35. The mobile media communication system, according to claim 25, further comprising the host network server configured to receive the at least one network site with category data, a media push tag with a time limit and an impression count;

the media server further configured to
(a) retrieve and to generate a weighting for the geotargeted media, the weighting being calculated with an elapsed time within the time limit and expended impression counts from the impression count, and with a relevancy parameter generated from a predetermined array of categories which maps the relevancy parameter to a plurality of media category identifiers; and
(b) communicate the geotargeted media having the weight exceeding a weighting threshold.

\* \* \* \* \*